(12) United States Patent
Wu et al.

(10) Patent No.: US 11,218,569 B1
(45) Date of Patent: *Jan. 4, 2022

(54) IP PACKET TRANSLATION FOR LOW-OVERHEAD OUT-OF-BAND DATA EMBEDDING

(71) Applicant: ARCHITECTURE TECHNOLOGY CORPORATION, Eden Prairie, MN (US)

(72) Inventors: John Wu, Eden Prairie, MN (US); Nathan E. Bahr, Eden Prairie, MN (US); Ranga S. Ramanujan, Medina, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/842,625

(22) Filed: Apr. 7, 2020

Related U.S. Application Data

(60) Continuation-in-part of application No. 16/687,786, filed on Nov. 19, 2019, now Pat. No. 10,917,501, which is a division of application No. 16/249,287, filed on Jan. 16, 2019, now Pat. No. 10,491,715.

(60) Provisional application No. 62/791,366, filed on Jan. 11, 2019.

(51) Int. Cl.
  *H04L 29/06* (2006.01)
  *H04L 29/08* (2006.01)
(52) U.S. Cl.
  CPC .............. *H04L 69/08* (2013.01); *H04L 69/22* (2013.01); *H04L 69/324* (2013.01)
(58) Field of Classification Search
  None
  See application file for complete search history.

(56) References Cited

U.S. PATENT DOCUMENTS

| | | | |
|---|---|---|---|
| 6,141,371 A | 10/2000 | Holmes et al. |
| 6,535,493 B1 | 3/2003 | Lee et al. |
| 6,775,251 B1 | 8/2004 | Wiedeman et al. |
| 7,289,460 B1 | 10/2007 | Thacker et al. |
| 7,463,597 B1 | 12/2008 | Kompella |
| 7,616,574 B2 | 11/2009 | Previdi et al. |
| 7,852,855 B1 | 12/2010 | Gooding et al. |
| 8,537,681 B1 | 9/2013 | Krishnan et al. |
| 8,548,377 B2 | 10/2013 | Dankberg et al. |
| 9,485,063 B2 | 11/2016 | Shattil |

(Continued)

OTHER PUBLICATIONS

U.S. Patent and Trademark Office, "Office Action", U.S. Appl. No. 16/687,786, filed Jul. 13, 2020, pp. 1-24.

(Continued)

*Primary Examiner* — Jamaal Henson
(74) *Attorney, Agent, or Firm* — Carlson, Caspers, Vandenburgh & Lindquist, P.A.

(57) ABSTRACT

A method of embedding information in a packet with low overhead is provided. The method includes receiving an IP packet at a first networking device and translating it into an intermediary packet having a non-IP header and a data field. Translating includes copying at least the transport layer data field into the data field of the intermediary packet, compressing the IP header, and embedding out-of-band data into the non-IP header of the intermediary packet. The intermediary packet is sent to second networking device. At the second networking device the intermediary packet is translated into a re-created IP packet. The re-created IP packet is sent toward a destination of the original IP packet.

20 Claims, 14 Drawing Sheets

(56) References Cited

U.S. PATENT DOCUMENTS

| | | |
|---|---|---|
| 9,729,581 B1 | 8/2017 | Skene et al. |
| 2002/0067725 A1 | 6/2002 | Oguchi et al. |
| 2003/0063591 A1* | 4/2003 | Leung ................ H04L 12/1886 |
| | | 370/338 |
| 2004/0153573 A1 | 8/2004 | Kim et al. |
| 2005/0021789 A1 | 1/2005 | Iloglu et al. |
| 2006/0251115 A1 | 11/2006 | Haque et al. |
| 2007/0180104 A1 | 8/2007 | Filsfils et al. |
| 2008/0172732 A1 | 7/2008 | Li et al. |
| 2009/0110085 A1 | 4/2009 | Kennedy et al. |
| 2009/0290564 A1 | 11/2009 | Shin et al. |
| 2010/0232300 A1 | 9/2010 | Kashima |
| 2010/0284305 A1 | 11/2010 | Papp et al. |
| 2011/0032843 A1 | 2/2011 | Papp et al. |
| 2011/0116499 A1 | 5/2011 | Lim et al. |
| 2011/0274108 A1 | 11/2011 | Fan |
| 2012/0082161 A1 | 4/2012 | Leung et al. |
| 2012/0163383 A1 | 6/2012 | Ech-Chergui |
| 2012/0218936 A1 | 8/2012 | Fleeman et al. |
| 2013/0070745 A1* | 3/2013 | Nixon .................... H04L 45/74 |
| | | 370/338 |
| 2015/0098472 A1 | 4/2015 | Choi et al. |
| 2017/0064039 A1 | 3/2017 | Shen et al. |
| 2017/0302475 A1 | 10/2017 | Chan et al. |
| 2020/0213152 A1* | 7/2020 | Choquette ............. H04L 47/825 |

OTHER PUBLICATIONS

U.S. Patent and Trademark Office, "Notice of Allowance", U.S. Appl. No. 16/249,287, dated Sep. 11, 2019, pp. 1-8.
U.S. Patent and Trademark Office, "Notice of Allowance", U.S. Appl. No. 16/249,331, dated Apr. 26, 2019 pp. 1-8.
U.S. Patent and Trademark Office, "Notice of Allowance", U.S. Appl. No. 16/249,341, dated Apr. 26, 2019, pp. 1-9.
U.S. Patent and Trademark Office, "Office Action", U.S. Appl. No. 16/249,287, dated May 23, 2019, pp. 1-23.
U.S. Patent and Trademark Office, "Office Action", U.S. Appl. No. 16/687,786, dated Feb. 7, 2020, pp. 1-21.
Wu, et al., "ADNS IPv6 Transition Architecture and Analysis" IEEE MILCOM 2014, pp. 1-6, Oct. 2014, USA.
U.S. Patent and Trademark Office, "Notice of Allowance and Fee(s) Due", U.S. Appl. No. 16/687,786, dated Oct. 1, 2020, 9 pgs.

* cited by examiner

IP PACKET TRANSLATION FOR LOW-OVERHEAD OUT-OF-BAND DATA EMBEDDING

RELATED APPLICATIONS

This application is a continuation-in-part of U.S. patent application Ser. No. 16/687,786 filed on Nov. 19, 2019, entitled "PACKET CONTROL FOR A BROADCAST NETWORK", which is a divisional of U.S. patent application Ser. No. 16/249,287 filed on Jan. 16, 2019, entitled "IP PACKET TRANSLATION TO PIGGYBACK NETWORKING INFORMATION", now U.S. Pat. No. 10,491,715, which claims the benefit of U.S. Provisional Application No. 62/791,366 filed on Jan. 11, 2019, entitled "IP PACKET TRANSLATION TO PIGGYBACK NETWORKING INFORMATION", all of which are hereby incorporated herein by reference.

GOVERNMENT CONTRACTS

This invention was made with government support under contract N68335-18-C-0213 awarded by the Navy. The government may have certain rights in the invention.

BACKGROUND

A low bit-rate network or a link, such as a satellite communication network or link, can be used to interconnect two or more higher bit-rate IP networks. In such a situation, the low bit-rate network or link can be a bottleneck for data transport between the two or more higher bit-rate IP networks.

BRIEF DESCRIPTION

Embodiments for a method of embedding information in a packet with low overhead. The method includes receiving, at a first networking device over a network link, an original internet protocol (IP) packet having an IP header and an IP data field. The IP data field includes a transport layer protocol data unit (PDU) including a transport layer header and a transport layer data field. The original IP packet is translated at the first networking device into an intermediary packet having a non-IP header and a data field. Translating includes copying at least the transport layer data field into the data field of the intermediary packet, compressing the IP header and embedding out-of-band data into the non-IP header of the intermediary packet. The intermediary packet is sent to and received at a second networking device. The intermediary packet is translated into a re-created IP packet at the second networking device. This translating includes extracting the out-of-band data from the non-IP header of the intermediary packet, copying at least the transport layer data field from the data field of the intermediary packet into an IP data field of the re-created IP packet, and creating an IP header for the re-created IP packet to correspond to the IP header of the original IP packet. The re-created IP packet is sent over a network link from the second networking device toward a destination of the original IP packet.

Embodiments for a method of embedding information in one or more IP packets being sent across a non-IP network are also provided. The method includes receiving a plurality of original IP packets at a first networking device over one or more network links. The first networking device determines based on characteristics of an IP header of the IP packet whether each of the plurality of original IP packets is compatible for embedding of out-of-band data. For each of the plurality of original IP packets that is not compatible, the original IP packet is sent to one or more other networking devices, and forwarded, from the one or more other networking devices, toward a destination IP address of the original IP packet. For one or more of the plurality of original IP packets that are compatible, the first networking device translates the original IP packet into an intermediary packet having a non-IP header and a data field. Translating includes copying at least the transport layer data field into the data field of the intermediary packet, compressing the IP header, and embedding out-of-band data into the non-IP header of the intermediary packet. The intermediary packet is sent to and received at a second networking device. The second networking device translates the intermediary packet into a re-created IP packet. This translating includes extracting the out-of-band data from the non-IP header of the intermediary packet, copying at least the transport layer data field from the data field of the intermediary packet into an IP data field of the re-created IP packet, and creating an IP header for the re-created IP packet to correspond to the IP header of the original IP packet. The re-created IP packet is sent over a network link from the second networking device toward a destination of the original IP packet.

Embodiments for a program product are also provided. The program product includes a non-transitory processor readable medium having software stored thereon. The software, when executed by one or more processing devices of a first networking device is configured to receive over a network link, an original Internet protocol (IP) packet having an IP header and an IP data field. The IP data field includes a transport layer protocol data unit (PDU) including a transport layer header and a transport layer data field. The software is also configured to translate the original IP packet into an intermediary packet having a non-IP header and a data field. Translating includes copying at least the transport layer data field into the data field of the intermediary packet, compressing the IP header, and embedding out-of-band data into the non-IP header of the intermediary packet. The software is configured to send the intermediary packet to a second networking device. The software is also configured to receive a second intermediary packet and translate the intermediary packet into a re-created IP packet. This translating includes extracting second out-of-band data from a second non-IP header of the second intermediary packet, copying at least a second transport layer data field from a second data field of the second intermediary packet into an IP data field of the re-created IP packet, and creating an IP header for the re-created IP packet to correspond to a second IP header of a second original IP packet from which the second intermediary packet was created. The software is also configured to send over a network link the re-created IP packet toward a destination of its corresponding original IP packet.

DRAWINGS

Understanding that the drawings depict only exemplary embodiments and are not therefore to be considered limiting in scope, the exemplary embodiments will be described with additional specificity and detail through the use of the accompanying drawings, in which.

DETAILED DESCRIPTION

Figure 1:
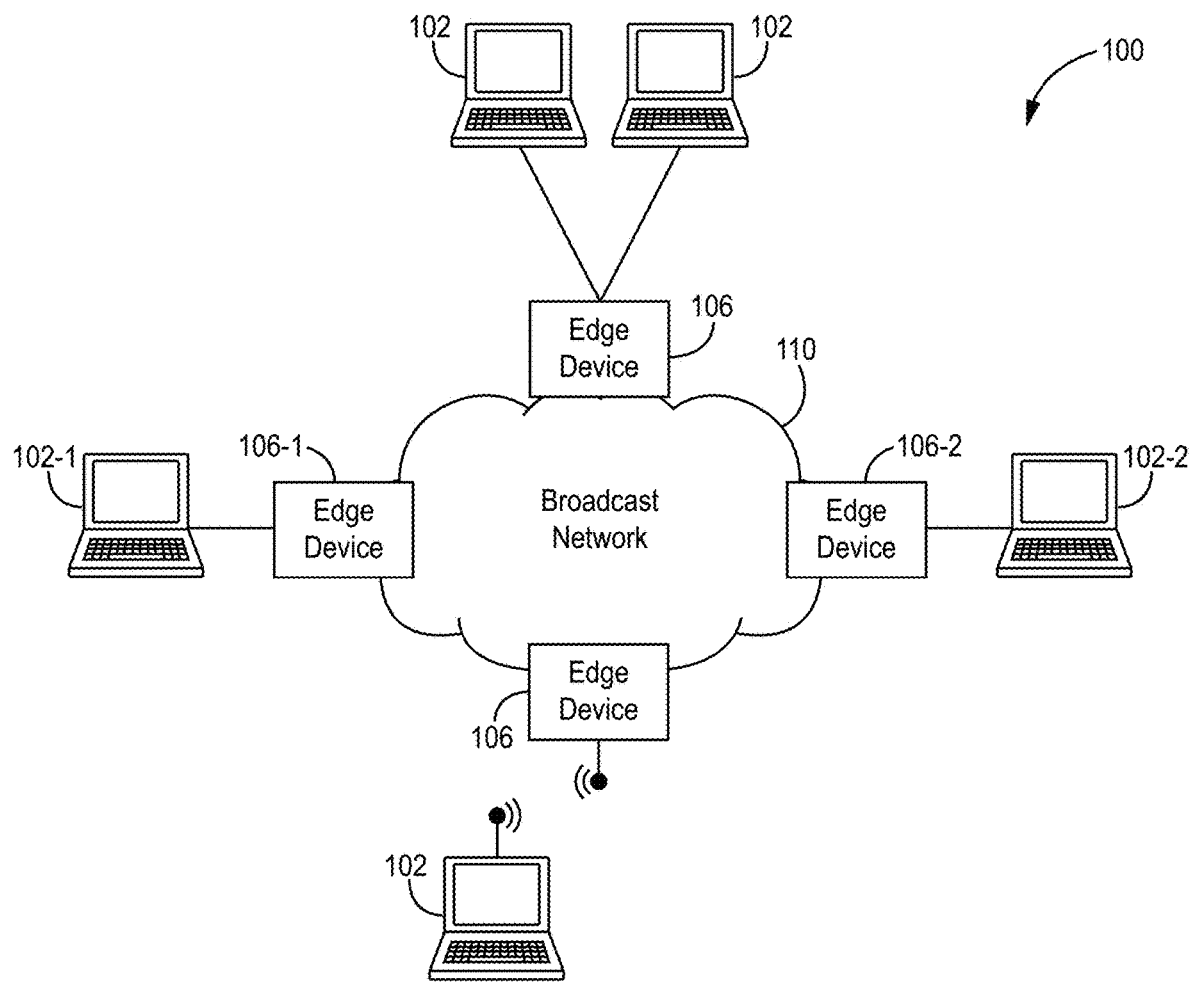
FIG. 1 is a block diagram of an example network including a plurality of edge devices exchanging networking information over a broadcast network.

FIG. 1 is a block diagram of an example network 100 implementing a distributed performance enhancing proxy (PEP) for efficiently transferring information across a low bit-rate network or link. Network 100 includes a plurality of endpoint devices 102 communicatively coupled together via a broadcast network 110. Endpoint devices 102 communicate IP packets therebetween via the broadcast network 110. The subnets outside of the broadcast network 110, including the endpoint devices 102 operates in accordance with an IP protocol. In an example, the subnets outside of broadcast network 110 operate in accordance with the IP version 4 (IPv4) protocol. In another example the subnets outside of broadcast network 110 operate in accordance with the IP version 6 (IPv6) protocol.

In an example, the broadcast network 110 operates in accordance with a non-IP protocol, which is also referred to herein as the "ZOOM protocol". A plurality of edge devices 106 implement distributed PEPS to translate between the IP protocol outside of the broadcast network 110 and the ZOOM protocol of the broadcast network 110 to transfer information from IP packets across the broadcast network 110. For example, a first edge device 106-1 can receive an IP packet from a first endpoint device 102-1, wherein the first IP packet has a second endpoint device 102-2 as a destination. The first edge device 106-1 can transform the IP packet into a packet that conforms to the ZOOM protocol (also referred to herein as a "ZOOM packet"). The first edge device 106-1 can then send the ZOOM packet into the broadcast network 110. A second edge device 106-2 can receive the ZOOM packet and transform the ZOOM packet back into an IP packet. This recreated IP packet can correspond to the (original) IP packet received by the first edge device 106-1 from the first endpoint device 102-1. The re-created IP packet can then be sent from the second edge device 106-2 to the second endpoint device 102-2. Since the re-created IP packet corresponds to the original IP packet sent from the first endpoint device 102-1, the edge devices 106-1 act to transport the IP packet from the first endpoint device 102-1 across the broadcast network 110 to the second endpoint device 102-2. The edge devices 106 translate the IP packets to and from the intermediary ZOOM packets for transport across the broadcast network 110.

The broadcast network 110 (including the edge devices 106) is configured to implement the ZOOM protocol therein to provide increased efficiencies over the IP protocol given the low bit-rate links in the broadcast network 110. In an example, the ZOOM protocol enables networking information to be communicated between the edge devices 106 along with the information for the IP packets in the same number of bits as the IP packets themselves would take. The ZOOM protocol does this by modifying the IP packets to remove information that does not need to be transferred across the broadcast network and to replace the removed information with networking information.

The broadcast network 110 includes a plurality of edge devices 106 that implement the distributed PEPs and control which packets are sent into the broadcast network 110. Each edge device 106 is communicatively disposed between one or more endpoint devices 102 and the broadcast network 110 and acts as a protocol translator between the IP network for those one or more endpoint devices 102 to the broadcast network 110. The plurality of endpoint devices 102 can communicate IP packets therebetween by sending and receiving the IP packets over the broadcast network 110 via their respective edge device 106. The edge devices 106 receive outbound IP packets from the endpoint device(s) 102 therebehind, translate the IP packets into ZOOM packets, and send the ZOOM packets into the broadcast network 110. The edge devices 106 also receive inbound ZOOM packets from the broadcast network 110, translate those ZOOM packets back into IP packets, and send the IP packets to the endpoint device(s) 102 therebehind.

Each of the plurality of endpoint devices 102 can be communicatively coupled to a respective edge device 106 over one or more respective wired and/or wireless network links. Each endpoint device 102 is a device capable of generating and receiving original IP packets for communication with another endpoint device 102 over an IP network. Example endpoint devices 102 include a personal computing device (e.g., a desktop computer, laptop computer, mobile device), IP phone, server, industrial equipment, sensor, encryption device, and a networking device generating or receiving original IP packets. Zero, one, or more than one endpoint device 102 can be behind each edge device 106.

The edge devices 106 are part of the larger broadcast network 110 of devices and are communicatively disposed at the edge of the broadcast network 110. Edge devices 106 are networking devices that control and forward information between the broadcast network 110 and the IP networks outside the broadcast network 110. All ZOOM packets sent into the broadcast network 110 by the edge devices 106 of the broadcast network 110 are received by all other edge devices 106 of the broadcast network 110. Packets sent and received by the edge devices 106 to and from devices "behind" the edge devices 106 (i.e., devices outside of the broadcast network 110 communicatively coupled to the edge devices 106, such as endpoint devices 102) are sent or forwarded along according to the protocol of the particular network or sub-net that is behind that edge device 106 (e.g., a local area network (LAN)).

The edge devices 106 control entry of IP packets into the broadcast network 110 to reduce the number of packets sent therein to destinations that are unreachable. To control entry of IP packets, the edge devices 106 maintain a table of forward destinations. The table of forward destinations is an indication of the destinations that are reachable via the broadcast network 110. In some examples, the table can also include indications of destinations that are known to be not reachable. Based on the table of forward destinations, the edge devices 106 take actions so that IP packets to unreachable forward destinations are discarded (filtered out) prior to entry into the broadcast network 110. The forward destinations can be indicated in the table in any suitable form, such as via a device IP address or a subnet IP address.

To maintain the table of forward destinations, the edge devices 106 exchange networking information with one another over the broadcast network 110. The networking information is control plane information for the edge devices 106. The networking information includes reachability information indicating the reachability of endpoint devices 102 and/or subnets behind the edge devices 106. For example, edge device 106-1 can send out reachability information indicating that endpoint device 102-1 or a subnet thereof is reachable via edge device 106-1. Likewise, edge device 106-2 sends out reachability information indicating that endpoint 102-2 or a subnet thereof is reachable via edge device 106-2. Other networking information transferred by edge devices 106 can include link monitoring information, link management information, or a data compression technique used (e.g., for IP address or subnets).

In some examples, the edge devices 102 can transfer non-networking control plane information (e.g., control information used by other devices or software modules distinct from the edge device 106 or edge software module). For example, if the edge device 106 is a WAM (discussed below with respect to FIG. 9), the edge device 106 can send WAM control information to other WAM edge devices 106 that the WAM would otherwise send over a dedicated control channel implemented by the WAMs. Transferring the WAM control information via ZOOM packets can be used instead of the dedicated control channel, freeing up the bandwidth of the dedicated control channel for other uses. Alternatively, transferring the WAM control information via ZOOM packets can be used as a back-up e.g., initiated on-demand in response to the dedicated control channel becoming unavailable (e.g., failing or overloaded) for some reason.

The edge devices 106 can communicate such information across the network 110 in a manner that efficiently utilizes the available bandwidth of the broadcast network 110. In particular, the edge devices 106 can communicate the information across network 110 by piggybacking the information with data from IP packets that are sent across the network 110. The IP packets can be user IP packets sent between the endpoint devices 102. To piggyback the information, the edge devices 106 can capture IP packets from one or more endpoint devices 102 behind the edge device 106 and modify the IP packets to create corresponding ZOOM packets. In the process of modifying the IP packets, the edge devices 106 can compress header portions of the IP packets and insert out-of-band data into the ZOOM packets. In an example, the compression of the header portion enables a ZOOM packet with out-of-band data to have a number of bits that is equal to or less than an IP packet from which it was created. The edge devices 106 then send the ZOOM packets across the network 110 to one or more other edge devices 106. When an edge device 106 receives a ZOOM packet, it can translate the ZOOM packet back into its corresponding original IP packet and sends the IP packet towards a destination endpoint device 102 behind the edge device 106. In the process of translating the ZOOM packet back into its corresponding original IP packet, the edge device 106 can extract the out-of-band data therefrom. In this manner, the out-of-band data and the IP packet can be communicated across the network 110 in around the same or even fewer bits than used by the original IP packet.

Out-of-band data can include any data that is not used in the re-creation of an IP packet by an edge device 106. Such out-of-band data can include networking information exchanged between the edge devices 106 as discussed above, non-networking control plane information as discussed above, or third-party data sent across the network 110 by edge devices 106. Out-of-band data does not include information copied from an IP packet or compressed forms of data from an IP or other header of an IP packet as such information is used to re-create the original IP packet at a receiving edge device 106. Networking information, such as reachability information as discussed above, is used by the routing protocol to make routing decisions but has no part in the re-creation of an IP packet and is accordingly considered "out-of-band" data as used herein.

Advantageously, by utilizing the ZOOM protocol and creating ZOOM packets, the out-of-band data and the IP packets can be communicated across the broadcast network 110 in the same or fewer number of bits as the original IP packet contained. Thus, the out-of-band data can be communicated across the broadcast network 110 with no increase in the number of bits required as compared to simply forwarding the IP packets across the broadcast network 110.

Figure 2:
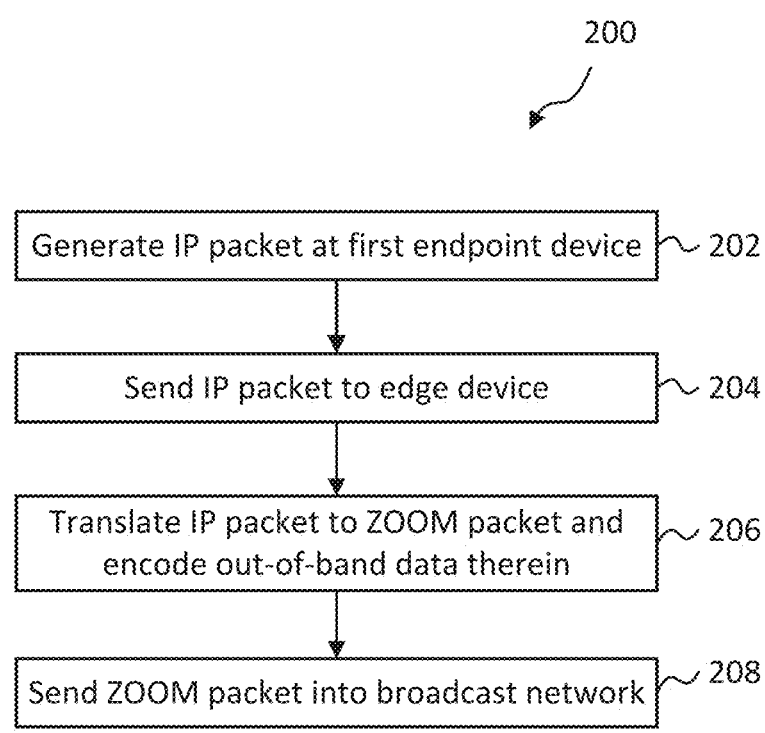
FIG. 2 is a flow diagram of an example method of translating an IP packet into a ZOOM packet.

FIG. 2 is an example method 200 that can be performed by the edge devices 106 to piggyback the out-of-band data with data from an IP packet sent across the broadcast network 110. First endpoint device 102-1 can generate a first IP packet for a destination wherein the first IP packet will be sent to the destination via the broadcast network 110 (block 202). In this example, the destination of the first IP packet is the second endpoint device 102-2. The first endpoint device 102-1 can generate the first IP packet in accordance with the IP standard to which the first endpoint device 102-1 and the second endpoint device 102-2 operate. The first endpoint device 102 can then send the first IP packet to the first edge device 106-1 for traversing the broadcast network 110 (block 204). In some examples, one or more network devices (e.g., a bridge hub, switch router) can be disposed between the first endpoint device 102-1 and the first edge device 106-1. In any case, the first edge device 106-1 receives the first IP packet, translates the IP packet into a ZOOM packet (block 206). Translating the IP packet into a ZOOM packet (block 206) includes compressing the IP packet to reduce the number of bits used to send the IP packet information across network 110 and adding out-of-band data in with the compressed IP packet information to form a ZOOM packet. The edge device 106 then sends the ZOOM packet into the broadcast network 110 (block 208). Once the ZOOM packet has been created, the original IP packet can be discarded.

Edge devices 106 are able to communicate the out-of-band data efficiently across the network 110 by compressing portions of an IP packet and sending the out-of-band data along with compressed IP packet. In an example, a ZOOM packet includes a ZOOM header and a ZOOM data field. The ZOOM header for a ZOOM packet includes compressed forms of one or more header(s) of the IP packet from which the ZOOM packet is created. The ZOOM data field includes copies (which are not compressed) of any fields in the IP packet that are not compressed. Thus, translating from an IP packet to a ZOOM packet includes compressing one or more headers of the IP packet to form a ZOOM header and copying the remaining portions of the IP packet to form the ZOOM data field. Compressing one or more headers of the IP packet enables out-of-band data to be included in the ZOOM header with the compressed headers, while the ZOOM header uses about the same number of bits as the header(s) that were compressed. Thus, the ZOOM packet includes the additional out-of-band data and all necessary information from the IP packet in about the same number of bits as the IP packet itself used originally. This enables the out-of-band data to be communicated across network 110 without incurring much if any additional overhead data. In an example, the ZOOM packet uses the same or fewer bits as the IP packet from which the ZOOM packet was created.

In an example, the edge devices 106 analyze IP packets received over one or more network links from endpoint devices 102 behind the edge devices 106 to determine whether the IP packets are compatible for embedding of out-of-band data therein. The edge devices 106 determine whether IP packets are compatible based on characteristics of the IP packet. These characteristics can include a version of the Internet Protocol to which the IP packet corresponds (e.g., IPv4 or IPv6) and types of expansion headers included in the IP header. In an example, if the IP packet is of a type other than IPv4 or includes an options extension header the edge devices 102 determine that the IP packet is not compatible and do not embedded any out-of-band data with the IP packet. If the packet is an IPv4 packet and does not include an options extension header, the IP packet is determined to be compatible by an edge device 106.

Figure 3A:
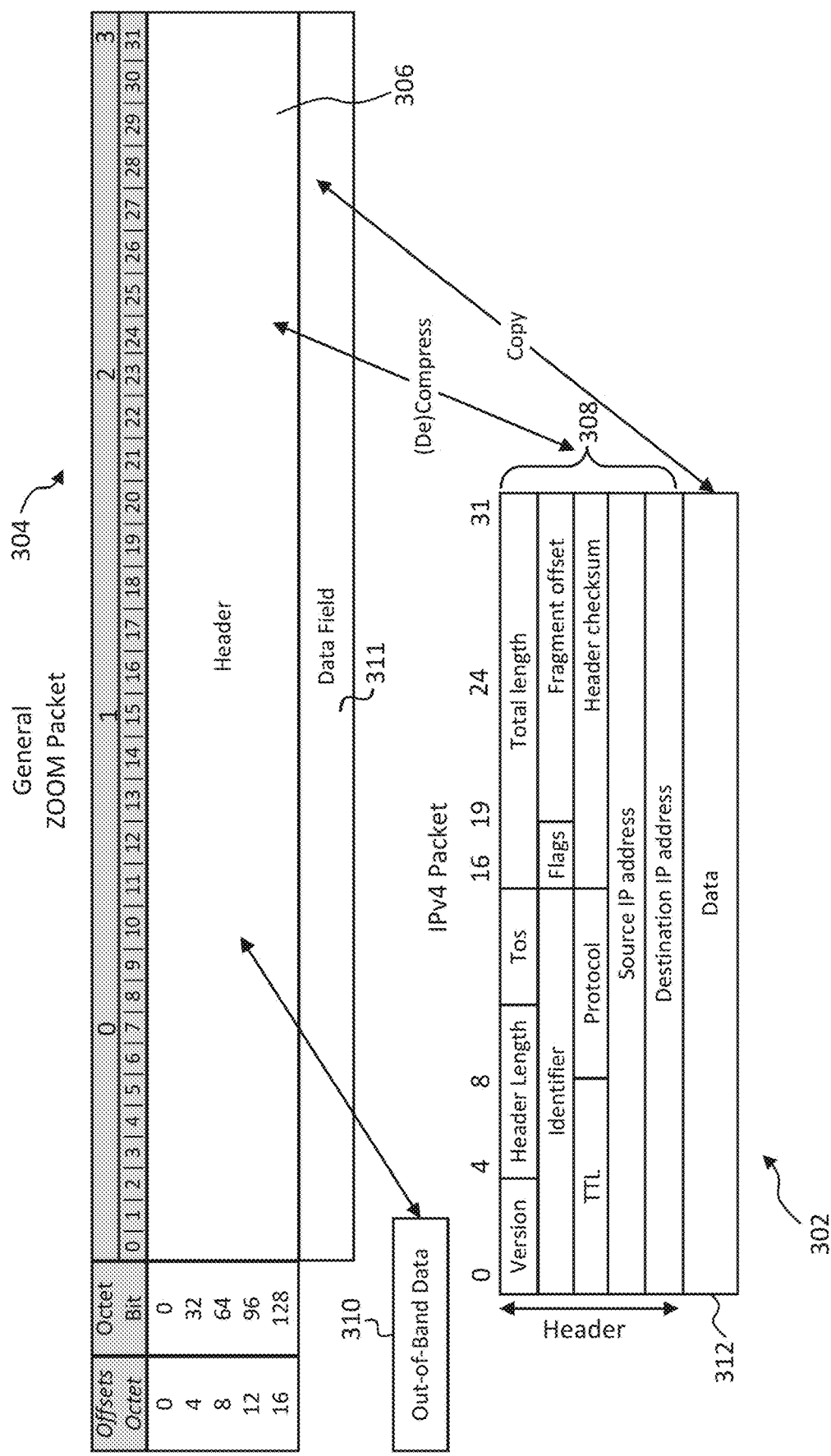
FIG. 3A is an illustration of an example translation between an IP packet and a general ZOOM packet.
Figure 3B:
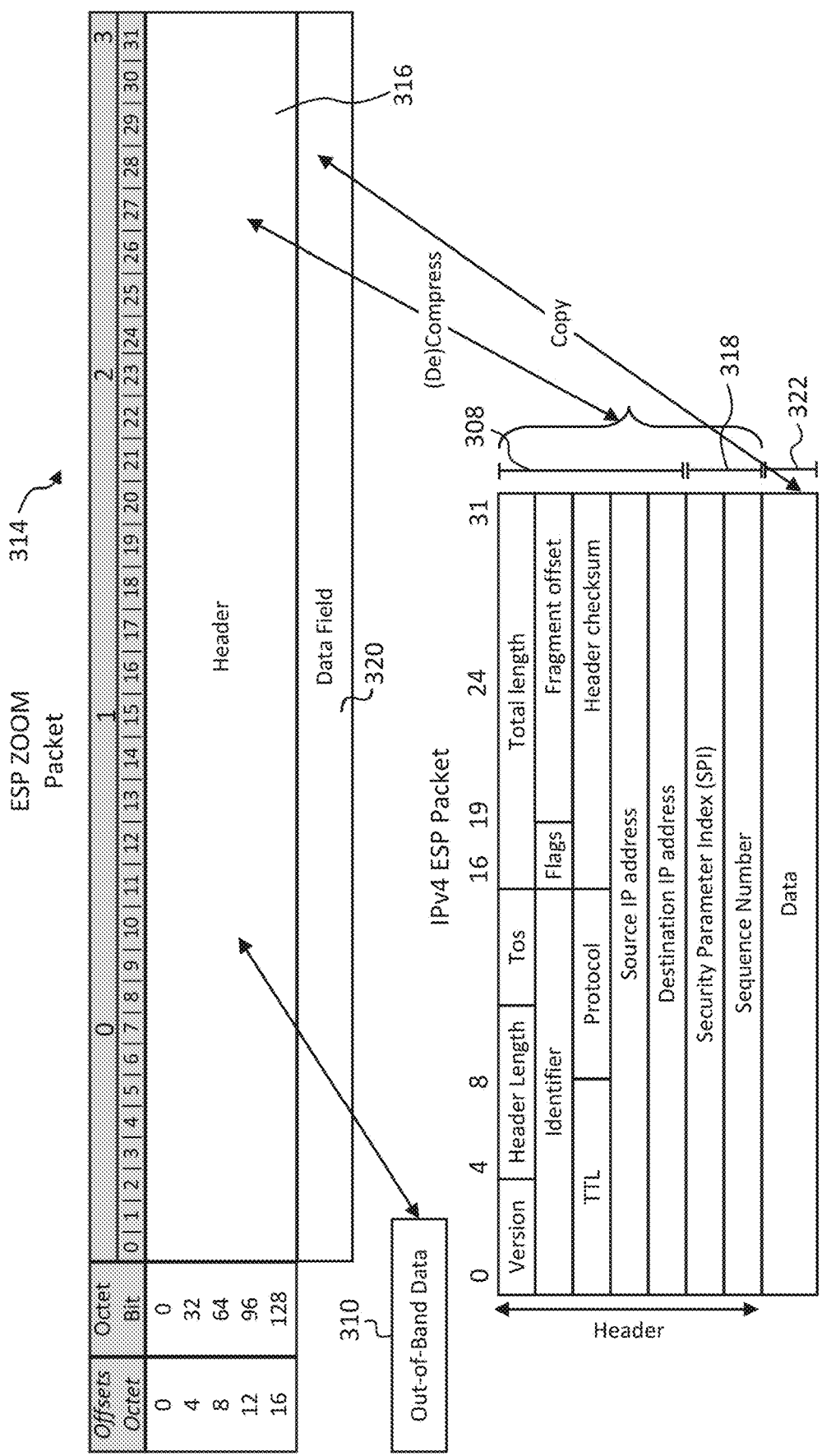
FIG. 3B is an illustration of an example translation between an IP packet and an ESP ZOOM packet.
Figure 3C:
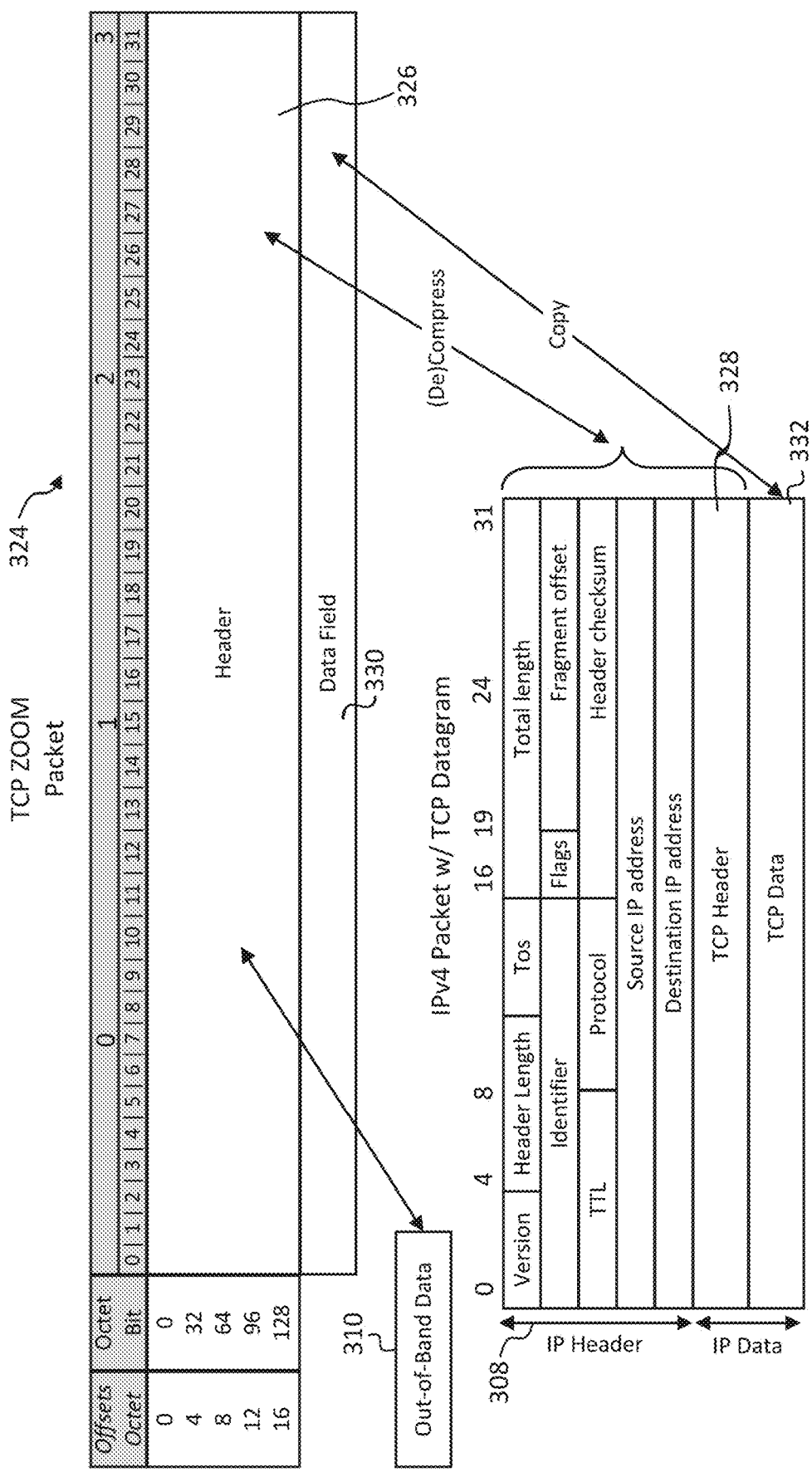
FIG. 3C is an illustration of an example translation between an IP packet and a TCP ZOOM packet.

FIGS. 3A-3C illustrate example relationships between respective types of IP packets that are compatible for embedding of out-of-band data, and the ZOOM packets to which those types of IP packets are translated. In this example, different types of IP packets are translated into different types of ZOOM packets. Different types of ZOOM packets are used in order to enable compression of portions of IP packets that are unique to that type of IP packet. The edge devices 106 analyze the IP packet received from endpoint devices 102 therebehind to determine which type of ZOOM packet to translate a given IP packet into and to determine what information from the IP packet to include in the ZOOM packet. The edge devices 106 can analyze one or more characteristics of an IP packet received and determine what type of ZOOM packet to translate the IP packet into. The characteristics can include a type of extension header included in the IP header, a type of a transport layer protocol data unit (PDU) (e.g., TCP, UDP, ICMP) in the IP packet, and/or a position of the IP packet in a TCP sequence. Types of extension headers include whether the IP header of an IP packet includes an encapsulating security payload (ESP) header or an authentication header (AH). The position of the IP packet in a sequence can be a characteristic because different information from the IP packet can be included in a ZOOM packet at different times during a sequence of IP packets in order to accurately re-create source and destination IP addresses and/or sequence numbers when the edge devices 106 re-create an IP packet.

FIG. 3A illustrates translation to one type of ZOOM packet. The ZOOM packet shown in FIG. 3A is referred to herein as a general type ZOOM packet 304. In an example, an edge device 106 translates to a generate type ZOOM packet if a compatible IP packet contains a transport layer PDU with a format other than transmission control protocol (TCP), and does not have an ESP or AH extension header. An example of such an IPv4 packet 302 is shown in FIG. 3A. A general type ZOOM packet 304 has a ZOOM header 306 that includes a compressed form of the base (required) IPv4 header 308 and a ZOOM data field 311 that includes a copy of the remaining portions 312 of the IPv4 packet 302. The base IPv4 header 308 consists of all the required fields of in an IPv4 header. The fields in the base IPv4 header 308 include: version, Internet Header Length (IHL), Differentiated Services Code Point (DSCP), Explicit Congestion Notification (ECN), Total Length, Identification, Flags, Fragment Offset, Time to Live (TTL), Protocol, Header Checksum, Source Address, and Destination Address fields.

Translating an IPv4 packet 302 having the characteristics listed in the beginning of the previous paragraph into a general type ZOOM packet 304 includes compressing the base IPv4 header 308 and adding in out-of-band data 310 to form the ZOOM header 306. Translating an IPv4 packet 302 having the characteristics listed in the beginning of the previous paragraph into a general type ZOOM packet 304 also includes copying the data field 312 of the IPv4 packet 302 into the data field 311 of the ZOOM packet 304.

Compressing the base IPv4 header 308 during such a translation includes copying some information from the IPv4 header 308 into the ZOOM header 306, discarding other information from the IPv4 header 308 without incorporation in the ZOOM header 306, and optionally including compressed forms of some information from the IPv4 header 308 in the ZOOM header 306. In an example, the information copied, discarded, and included in compressed form from the IPv4 header 308 varies based on characteristics of the IPv4 packet 302. The information that is copied, discarded, and included in compressed form from an IPv4 header is based on whether the information is used for re-creation of the IP packet by an edge device 106 receiving the ZOOM packet 304. If the information in the IPv4 header is not used for re-creation of the IP packet, the information is discarded. If the information is used for re-creation of the IP packet, the information is either copied (not compressed) into the ZOOM header 306 or included in compressed form in the ZOOM header 306 so that the information is communicated as part of the ZOOM packet 304 to the edge devices 106 and can be used to recreate the IP packet. In an example, the data in the differential services code point (DSCP) field, IP protocol number field, and explicit congestion notification (ECN) field are copied from the base IPv4 header 308 into the ZOOM header 306 when creating a general type ZOOM packet.

At least the 11 least significant bits of the IP total length field are also copied into the ZOOM header 306. In an example, the edge devices 106 are configurable such that only the X least significant bits of the IP total length field are extracted depending on the maximum transmission unit (MTU) used by the net IP network behind the edge device 106. For example, many IP networks operate with an MTU size of 1500, which only requires 11 bits at most to advertise in the IP total length field. In such a situation, the edge devices 106 can be set to copy only the 11 least significant bits of the IP total length field into the ZOOM header 306. The edge devices 106 can be manually configured to extract X least significant bits based on the MTU size of the IP network, or can automatically discover the MTU size and set the number of bits extracted to correspond thereto. In an example, the edge devices 106 communicate to coordinate the number of bits copied from the IP total length field so that all edge devices 106 copy the same number of bits.

Information regarding the source and destination IP address fields are also extracted from the IP header 302 and included in the ZOOM header 306. In an example, the source and destination IP address are copied into the ZOOM header 306. In an alternative example, one or both of the source IP address and the destination IP address are compressed and the compressed form is included in the ZOON header 306. In an example, data compression of the source IP address and/or destination IP address can also be used to obtain additional bits. For example, if all edge devices 106 for the broadcast network 110 communicate only with a known list of subnets, each edge device 106 can be configured with a table association each subnet in the list of subnets with an index number (e.g., from 1 to 2047). This index number can be represented in a smaller number of bits than the source IP address and destination IP address respectively, and the index number can be included in the ZOOM packet instead of the source IP address or destination IP address. Thus, additional bits can be obtained from the source IP address and destination IP address field. All edge devices 106 are configured with the same association between index number and subnet, so that the index numbers will map the same for each edge device 106.

The ZOOM header 306 can also include one or more flags, such as a flag that indicates that the source IP address is compressed, a flag that indicates that the destination IP address is compressed, and a flag that indicates if the IP packet 302 is fragmented. The information in the ZOOM header 306 can be organized in accordance with a common (ZOOM) protocol followed by the edge devices 106. The ZOOM header 306 can also include a ZOOM protocol field that indicates a type for the ZOOM packet, such as general type ZOOM packet 302.

The information from that IP header 308 that is discarded and not included in the ZOOM header 306 can either be re-created by the edge devices 106 during re-creation of the IP packet 302 or is arbitrary. In an example, the data in the version field is discarded because ZOOM only operates on packets of a single IP protocol (e.g., IPv4), so the edge devices 106 recreating the IP packet know that the version field of the re-created IP packet corresponds to that single IP protocol (e.g., a 4 for IPv4). In an example, the edge devices 106 only process IP packets without options so the data in the Internet header length (IHL)) field is known to be 5 and is discarded. In an example, the data in the identification field is non-essential for non-fragmented packets, so the data in the identification field is discarded if the IP packet 302 is fragmented. The identification field can be copied if the IP packet 302 is fragmented. In an example, the reserved flag is always zero, so the data in the reserved flag can be re-created without extracting. In an example, the don't fragment (DF), MF, and fragment offset fields are non-essential for non-fragmented packets, so that data can be discarded for non-fragmented packets and copied for fragmented packets. In an example, the time to live value can be arbitrarily set during re-creation, so the data in that field can be discarded. Bits corresponding to fields of the IP header 308 with data that is discarded or is compressed are available to be used for communication of out-of-band data.

The data field 311 of the general type ZOOM packet 304 includes a copy of the bits from the data field 312 of the IP packet 302.

Any suitable format for the ZOOM packet 304 can be used, as long as the edge device 106 to which the ZOOM packet 304 is being sent is able to decode the bits to obtain the information therefrom. Each edge device 106 of the broadcast network 110 can be configured to follow a common ZOOM protocol so that all edge devices 106 of the broadcast network 110 can decode ZOOM packets from other edge devices 106 of the broadcast network 110 as described herein.

FIG. 3B illustrates translation to a second type of ZOOM packet. The ZOOM packet shown in FIG. 3B is referred to herein as an ESP ZOOM packet 314. In an example, an edge device 106 translates to an ESP ZOOM packet 314 if a compatible IP packet has an ESP extension header and does not have an authentication header (AH). An example of such an IPv4 ESP packet 315 is shown in FIG. 3B. An ESP ZOOM packet 314 has a ZOOM header 316 that includes compressed forms of the base IPv4 header 308 and the ESP extension header 318 and a data field 320 that includes a copy of all the portions of the IPv4 packet 315 following the ESP extension header 318.

Translating an IPv4 ESP packet 315 having the characteristics listed in the beginning of the previous paragraph into an ESP ZOOM packet 304 includes compressing the base IPv4 header 308, compressing the ESP header 318, and adding in out-of-band data 310 to form the ZOOM header 306. Translating an IPv4 ESP packet 315 having the characteristics listed in the beginning of the previous paragraph into an ESP ZOOM packet 304 also includes copying the data, padding, padding length, and next fields into the data field 320 of the ZOOM packet 314.

Compressing the base IPv4 header 308 and the ESP extension header 318 during such a translation includes copying, discarding, and optionally compressing information from the headers 308, 318 based on characteristics of the IPv4 packet 315. The information that is copied, discarded, and included in compressed form from an IPv4 header 308 and ESP extension header 318 is based on whether the information is used for re-creation of the IP packet by an edge device 106 receiving the ZOOM packet 314. If the information in the base IPv4 header 308 or ESP header 318 is not used for re-creation of the IP packet, the information is discarded. If the information is used for re-creation of the IP packet, the information is either copied (not compressed) into the ZOOM header 316 or included in compressed form in the ZOOM header 316 so that so that the information is communicated as part of the ZOOM packet 304 to the edge devices 106 and can be used to recreate the IP packet. In an example, the data in the differential services code point (DSCP) field, IP protocol number field, and explicit congestion notification (ECN) field are copied from the base IPv4 header 308 into the ZOOM header 316 when creating an ESP ZOOM packet 314. At least the 11 least significant bits of the IP total length field are also copied into the ZOOM header 316 in the same manner as discussed above with respect to a general ZOOM packet 306.

The destination IP address information from the IPv4 base header 308 is discarded and not included in the ZOOM header 316 because destination IP address can be re-created by an edge device 106 receiving an ESP ZOOM packet 314 based on a mapping between SPI value information in the ESP ZOOM packet 314 and the destination IP address. Each sequence (data flow) of ESP packets has an SPI value in the ESP extension header 318. Information corresponding to that SPI value from the ESP extension header 322 can be included in the ZOOM header 316 and used by an edge device 106 receiving the ESP ZOOM packet 314 to re-create the destination IP addresses for use when re-creating the IP packet.

In order to re-create the destination IP address from SPI value information, associations between SPI value, source IP address, and destination IP address can be stored by the edge devices 106. To create the mapping between SPI value and source and destination IP addresses, an initial IP ESP packet 315 in a sequence can be translated to a general ZOOM packet 304 instead of an ESP ZOOM packet 314. As discussed above with respect to FIG. 3A, a general ZOOM packet 304 includes in the ZOOM header 306 information corresponding to the source IP and destination IP address from the IP packet 304. The data field 311 of a general ZOOM packet 304 also includes a copy of all information in the IP packet 304 after the base IPv4 header 308. If the IPv4 packet 302 is an ESP packet 315, therefore, the data field of the general ZOOM packet 304 includes a copy of the ESP header 318, which includes the SPI value. Thus, translating the initial IP ESP packet in a sequence to a general ZOOM packet 304 instead of an ESP ZOOM packet 314 communicates the SPI value as well as the source and destination IP addresses to the edge devices 106 receiving such a general ZOOM packet 304. An edge device 106 receiving that general ZOOM packet 304 with source IP address, destination IP address, and SPI value can store an association between the SPI value and the source and destination IP addresses. The stored association between SPI value and source/destination IP address is also referred to herein as the "active data flows" for an edge device. In an example, each edge device 106 can maintain its active data flow to add in new data flows and remove data flows that are no longer active.

Subsequent IP ESP packets translated by an edge device 106 can be translated to ESP ZOOM packets 314, which do not include the destination IP addresses. An edge device 106 receiving such an ESP ZOOM packet 314 can re-create the destination IP addresses from the association saved from the previously received general ZOOM packet 304 and the SPI value.

The SPI value information included in the ESP ZOOM packet 314 can be a copy of the SPI value, which uses 4 bytes, or can be a hash of the SPI value, such as a 1, 2, or 3 byte hash. In an example, the edge devices 106 can initially use a lower byte hash for the SPI value and automatically increase the number of bytes used when necessary. The edge devices 106 can determine whether to increase the number of bytes used based on whether the SPI value information included in the ESP ZOOM packet 314 is unique within the ZOOM network. If the SPI value information in all ESP ZOOM packets 314 within the ZOOM network is unique within that ZOOM network then the edge devices 106 can continue using the same byte hash size. In an example, the edge devices 106 within a ZOOM network can communicate with one another to coordinate and use the same number of bytes for the SPI values. If the SPI value information is not unique (referred to herein as a "collision"), then the edge devices 106 can increase the byte hash size (e.g., by 1). The edge devices 106 can continually monitor for collisions and increase the byte hash size in response to a collision up to the highest level of 4 bytes (a copy of the SPI value). The information for such communication can be sent via out-of-band data.

In some situations, the largest byte SPI value information (a copy of the SPI value) will still result in collisions. The edge devices 106 can monitor for and in response to detecting such a collision, the edge devices 106 can adjust to include source IP address information in the ESP packet 314 along with the SPI value. Edge devices 106 receiving the ESP packet 314 with source IP address information and the SPI value can then use both of those items of information to map to a re-create the destination IP address. The source IP address information can be a copy of the source IP address or a compressed form as discussed above.

Based on this, the edge devices 106 can translate the initial one or more IP ESP packets in an ESP sequence to a general ZOOM packet 304 and subsequent IP ESP packets in that sequence to ESP ZOOM packets 314. In an example, the edge devices 106 can occasionally (e.g., periodically) translate subsequent IP ESP packets 315 in an ESP sequence into general ZOOM packets 304 to refresh the associations at the receiving edge devices 106.

The edge devices 106 can store a list of associations between SPI value and source/destination IP addresses for existing/current sequences of IP ESP packets 315 received from endpoint devices 102 behind the edge device 106 to determine whether IP ESP packets are in a new or existing ESP sequence. This list of associations can be combined with or in addition to the list of associations of SPI value to source/destination IP addresses for sequences being received from other edge devices 106. If an IP ESP packet 315 received from an endpoint device 102 behind an edge device 106 is part of a new sequence for that edge device 106 (the association between SPI value and source/destination IP address is not included in that edge device's list), the edge device 106 adds the association to the list and translates the IP ESP packet 315 to a general ZOOM packet 304 as the initial packet in an ESP sequence. Subsequent IP ESP packets in that sequence will be translated into ESP ZOOM packets 314 with the exception of the occasional general ZOOM packet 304 as a refresh.

In an example, the sequence number from the ESP header 318 of the IP ESP packet 315 is discarded when translating to an ESP ZOOM packet 314 because the sequence number is predictable (it increments numerically) and can be re-created based on this predictability. The initial packet in the ESP sequence and any occasional refresh packets sent as general ZOOM packets 304, which include a copy of the sequence number, can be used by the edge devices 106 to set and verify their re-creating the correct sequence number for subsequent packets. In an example, the edge devices 106 can detect when an IP ESP packet may have been routed to it via a different path (e.g., by identifying a gap in sequence numbers) such that the sequence number in an ESP ZOOM packet is not predictable and initiates a refresh in which one or more general ZOOM packets 304 are sent. During a refresh a set number (e.g., 5) consecutive IP ESP packets in a sequence are translated to a general ZOOM packet 304.

In some examples, the ZOOM protocol includes settings enabling a network administrator to set whether items of information are included in respective ZOOM packets. For example, for a network that has a high packet loss the sequence numbers for ESP ZOOM packets may not be predictable, so a network administrator can set the ZOOM protocol to include a copy of the sequence number in ESP ZOOM packets. Similar settings can be provided for other items of information.

An IP ESP packet with an authentication header (AH) can be acted on in the same manner as an IP ESP packet discussed above, except the next header and payload length fields are copied into the ZOOM packet.

FIG. 3C illustrates translation to a third type of ZOOM packet. FIG. 3C illustrates a TCP type ZOOM packet 324. An edge device 106 receiving an IP packet 325 having a TCP PDU can translate the IP packet 325 to a TCP ZOOM packet 324. Translating to a TCP ZOOM packet 324 can include copying, discarding, and compressing the same information from the IP header 308 as discussed above with respect to FIG. 3A for the TCP ZOOM header 326. Additionally, a compressed form of the TCP header 328 is included in the TCP ZOOM header 326. A copy of all information 332 after the TCP header 328 is included in the data field 330 of the TCP ZOOM header 326.

The compressed form of the TCP header 328 included in the TCP ZOOM header 326 can be based on the characteristics of the TCP header 328. If the ACK flag in the TCP header 328 indicates the TCP Acknowledgement field is used, the TCP Acknowledgement value is copied into the TCP header 328. If the TCP Acknowledgement field is not used, the bits corresponding thereto are discarded. If the URG flag indicated that the Urgent Pointer field is set, the Urgent Pointer value is copied into the TCP header 328. If the Urgent Pointer field is not set, the bits in the Urgent Pointer field are discarded.

More generally, once a ZOOM packet (general, ESP, AH, or TCP type) is created by a first edge device 106, the ZOOM packet is sent into the broadcast network 110. The first edge device 106 can continue capturing IP packets from endpoint device(s) 102 therebehind and translating them into ZOOM packets. In an example, each IP packet that is translated, is translated into a single corresponding ZOOM packet.

Given the broadcast nature of the ZOOM packets, the ZOOM packets sent into the broadcast network 110 are forwarded to all edge devices 106 in the broadcast network 110. Thus, the out-of-band data in a ZOOM packet sent into the broadcast network 110 is sent to all the edge devices 106 in the broadcast network 110. In an example, the out-of-band data in at least a portion of the ZOOM packets can be intended as a communication (e.g., message) between two or more edge devices 106 in the broadcast network 110. An example of out-of-band data that is intended to be received by all edge devices 106 is reachability information. Each edge device 106 can send reachability information into the broadcast network 110 and each edge device 106 can receive the reachability information from every other edge device 106. The edge devices 106 can maintain/update their table of forward destinations in accordance with the reachability information received from the other edge devices 106. For example, if the first edge device 106-1 sends reachability information indicating that the first endpoint device 102-1 is reachable via the first edge device 106-1 or more generally via the broadcast network 110. The other edge devices 106 upon receiving that reachability information can update or otherwise include an indication in their table of forward destinations that endpoint device 102-1 is reachable via the first edge device 106-1 or more generally that endpoint device 102-1 is reachable via the broadcast network 110. The reachability information can be indicated in the tables of forward destinations in any suitable manner. The reachability information can also be indicated in the ZOOM packets in any suitable manner. In an example, the IP addresses of the reachability destinations/sub-nets are indicated in the ZOOM packets using their index numbers to reduce the number of bits used. In an example, the reachability information includes an indication whether each destination identified in the ZOOM packet is reachable or no longer reachable. In an example, the reachability information includes an indication of how many different broadcast networks 110 must be traversed from the edge device 106 to get there. In an example, the reachability information includes an indication of whether compression (index numbers) are used for the destinations/sub-nets. In an example, the reachability information includes an indication of the prefix size of the destinations/sub-nets. With all edge devices 106 sharing and receiving reachability information in this way, all the edge devices 106 can maintain an up-to-date table of forward destinations via the broadcast network 110.

Figure 10:
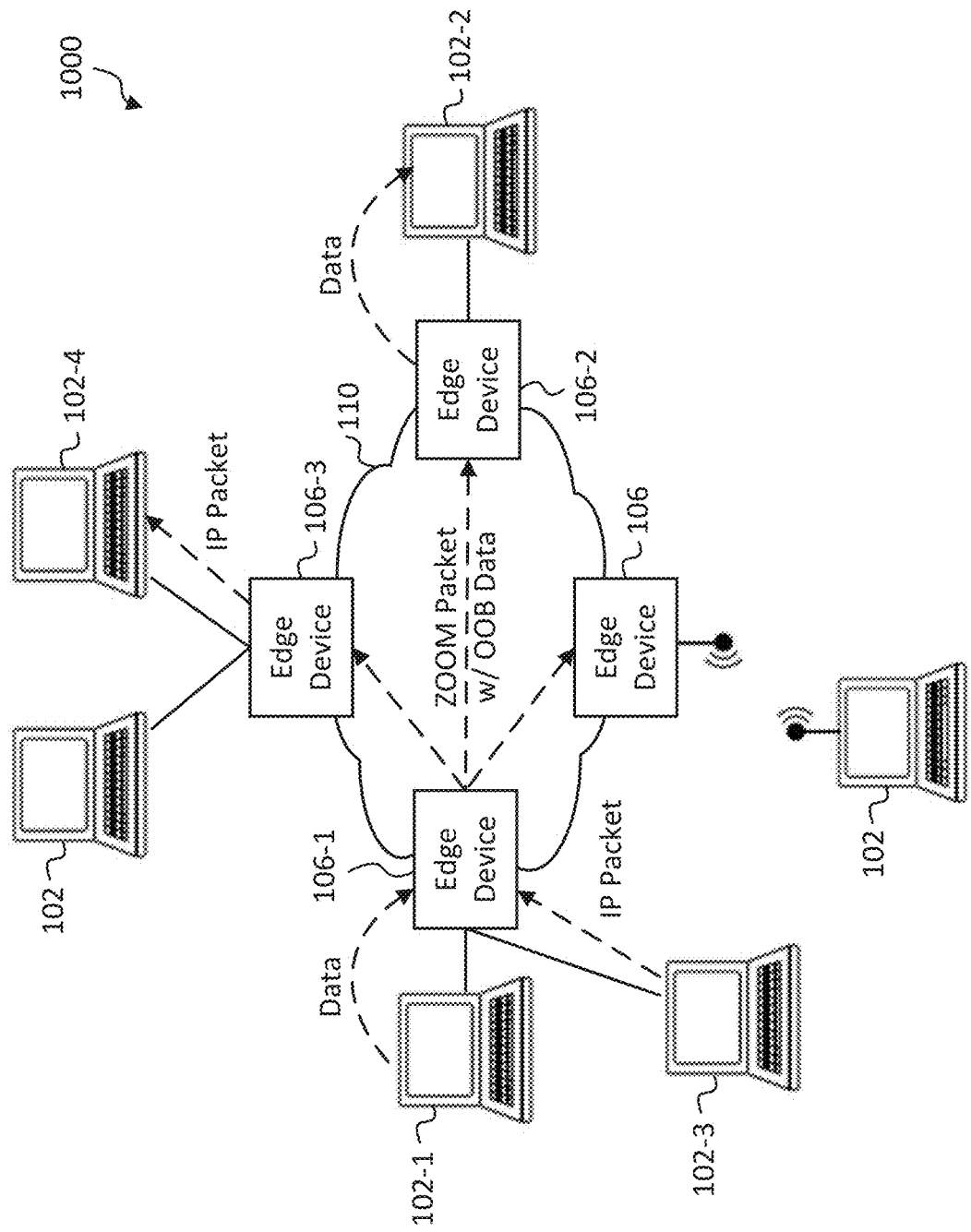
FIG. 10 is a block diagram of an example network in which a plurality of edge devices communicate info via out-of-band data in a ZOOM packet.

FIG. 10 is a diagram illustrating an example network 1000 that communicates out-of-band data in ZOOM packets across network 110. In this example, the out-of-band data is information to be communicated across the network 110 between endpoint devices 102. For example, a plurality of endpoint devices 102 disposed with the network 110 therebetween can be configured to send information to another of the endpoint devices 102 via out-of-band data transport across the network 110. To send information between endpoint devices 102 via out-of-band data transport, the endpoint device 102 sending and receiving the out-of-band transport information can be configured to communicate with the edge device 106 which they are behind. For example, if endpoint device 1024 desires to send information to endpoint device 102-2 via out-of-band transport, the endpoint device 102-1 sends a message to edge device 106-1 indicating the intent to send information via out-of-band transport to endpoint device 102-2. Notably, the message from endpoint device 102-1 is intended to be "read" by edge device 106-1. That message is not destined for another device past edge device 106-1. Accordingly, the message can be sent as payload (data field) in one or more IP packets having an IP address of edge device 106-1 in the destination IP address for the one or more IP packets. This is in contrast to an IP packet sent from endpoint device 102-1 with endpoint device 102-2 as its intended destination. Such an IP packet would have the IP address of endpoint device 102-2 as its destination IP address.

The endpoint device 102-1 can be configured, such as via a ZOOM app or other client installed thereon, to communicate such messages with the edge device 106-1. The messages from the endpoint device 102-1 to the edge device 106-1 can communicate the information to be transported as out-of-band data well as the destination endpoint device(s) 102 for the information. Upon receiving such an IP packet from the endpoint device 102-1, the edge device 106-1 unpacks the IP packet, discarding the header information during the process of unpacking the IP packet to obtain the payload information therein. It can add the information to be transported into one or more ZOOM packets along with information indicating a destination endpoint device(s) 102 for the information. The information to be transported as well as the information indicating a destination endpoint device(s) 102 can be added into one or more ZOOM packets as out-of-band data during translation as discussed above.

In examples where network 110 is a broadcast network 110, the out-of-band data included in a ZOOM packet is received by all edge devices 106 coupled to the network 110. The edge device(s) 106 receiving such a ZOOM packet can decode the ZOOM header to obtain the out-of-band data therein. Based on the destination indicated for the information in the out-of-band data, the edge device(s) 106 can determine whether a destination for the information is behind that edge device 106. If a destination is behind that edge device 106, the edge device 106 can send a message including the information to the appropriate endpoint device 102 (e.g., the ZOOM app or client thereon).

Notably, the communication of out-of-band data across network 110 is done in conjunction with the translation and transport of information for IP packets that are sent across network 110. Referring back to FIG. 10, endpoint device 1024 can send information via out-of-band transport to endpoint device 102-1 by sending a message via one or more IP packets to the edge device 106-1 communicating the information and the destination of endpoint device 102-2.

The endpoint device 102-3 can also send an IP packet to the edge device 106-1, wherein this IP packet itself can be destined for endpoint device 102-4.

The edge device 106-1 can unpack the one or more IP packets from endpoint device 102-1 to receive the message therein and determine that information is to be sent to endpoint device 102-2 via out-of-band data. The edge device 106-1 can also receive the IP packet from endpoint device 102-3 and determine that the IP packet itself is to be communicated across the network 110. The edge device 106-1 can then translate the IP packet from edge device 102-3 into a ZOOM packet and include in that ZOOM packet out-of-band data corresponding to the information from the endpoint device 102-1. The edge device 106-1 can then send the ZOOM packet into network 110.

The edge devices 106-2 and 106-3 can both receive the ZOOM packet. The edge device 106-2 can decode the ZOOM header and determine that a destination (endpoint device 102-2) for the out-of-band data is behind it. The edge device 106-2 can then generate a message via one or more IP packets and send the information from endpoint device 102-1 as payload in those one of more IP packets to the endpoint device 102-2. The edge device 106-2 can also determine that a destination for the IP packet translated into the ZOOM packet is not behind it, so the rest of the ZOOM packet can be discarded.

The edge device 106-3 can decode the ZOOM header and determine that a destination for the out-of-band data is not behind it. The edge device 106-3 can therefore discard that out-of-band data. The edge device 106-3 can also determine that the IP packet translated into the ZOOM packet does have a destination (endpoint device 102-4) behind it. The edge device 106-3 can then re-create the IP packet sent from the endpoint device 102-2 and forward it to endpoint device 102-4. In this way, IP packets and out-of-band data can be efficiently transported across network 110 together.

Figure 4:
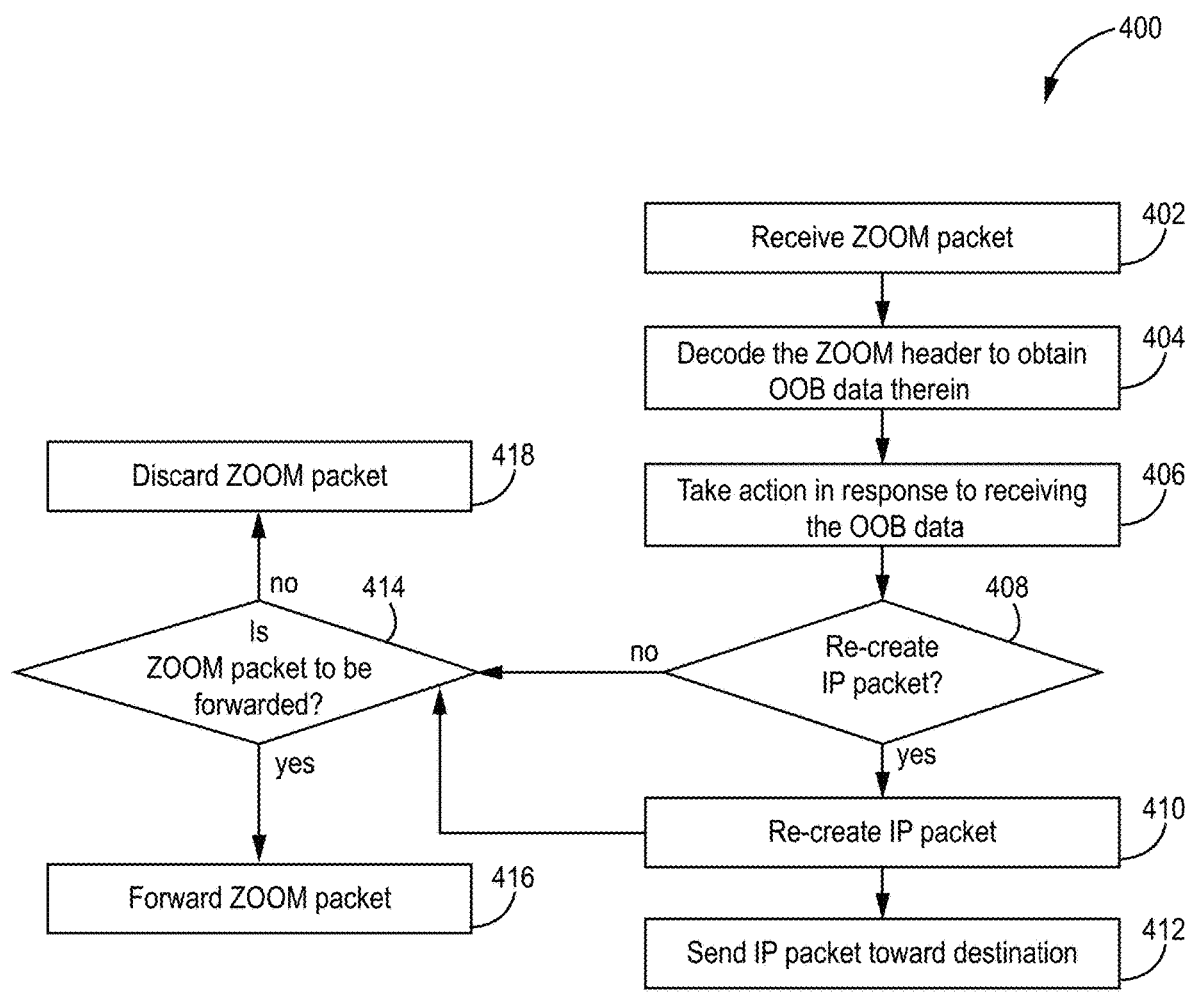
FIG. 4 is a flow diagram of an example method of receiving a ZOOM packet and re-creating an IP packet therefrom.

FIG. 4 is a flow diagram of a method 400 that can be performed by an edge device 106 to obtain out-of-band data from a ZOOM packet. A second edge device 106-2 can receive a ZOOM packet from the broadcast network 110 (block 402). In an example, the second edge device 106-2 can verify that the received packet is a ZOOM packet by checking a ZOOM flag bit in the header. In an example this flag bit is the first bit (bit 0) in the location where the version field of the IP header would be.

Once the second edge device 106-2 verifies that the received IP packet is a ZOOM packet (e.g., identifies that bit 0 of the ZOOM packet is '1'), the second edge device 106-2 can decode the ZOOM packet in accordance with the ZOOM protocol to obtain the out-of-band data therein (block 404). In an example, decoding the ZOOM packet includes reading the bits of the ZOOM header in accordance with the ZOOM protocol. Once the out-of-band data that is in the ZOOM header is decoded, the second edge device 106-2 can take action based on the out-of-band data (406). For example, the second edge device 106-2 can obtain reachability information indicating that the first endpoint device 102-1 is reachable via the first edge device 106-1. The second edge device 106-2 can then update its table of forward destinations to include an indication that the first endpoint device 102-1 is reachable via the first edge device 106-1, or more generally via the broadcast network 110.

Once the out-of-band data has been obtained by the second edge device 106-2 from the ZOOM packet, the second edge device 106-2 can determine whether to re-create the IP packet corresponding to the ZOOM packet (block 408). In an example, the second edge device 106-2 can determine that the IP packet corresponding to the ZOOM packet is to be re-created if a destination IP address corresponding to the ZOOM packet is behind the second edge device 106-2. As discussed above, the destination IP address can be identified based on information in the ZOOM packet (in the case of a general or TCP ZOOM packet) or based on an association stored between SPI value information in an ESP or AH ZOOM packet and the destination IP address. If the destination IP address corresponding to the ZOOM packet corresponds to a destination behind the second edge device 106, the second edge device 106-2 re-creates the IP packet from the ZOOM packet (block 410) and sends the IP packet towards its destination. If the destination IP address does not correspond to a destination behind the second edge device 106, the second edge device 106 does not re-create the IP packet and the method can proceed to block 414.

The second edge device 106-2 can re-create the original IP packet by recreating the IP header, the ESP header (if present), and TCP header (if present) from the information in the ZOOM header. The data field of the ZOOM packet can be copied to after the last header re-created to complete the IP packet. Also, information from the list of active data flows can be used to re-create the original IP packet. As discussed above, the list of active data flows can include an association between each data flow by SPI value and the corresponding destination IP address and source IP address. The list can be updated/populated with information from an initial packet in the data flow. As discussed above, for the initial packet in an ESP packet data flow, the edge devices 106 can translate the ESP IP packet into a general ZOOM packet which includes the source IP address (or an index value indicative thereof), along with the SPI value and the destination IP address (or a corresponding index value). Thus, an edge device 106 receiving that ZOOM packet can store in its list of active data flows an association between the SPI value, the source IP address, and the destination IP address. For subsequent ESP IP packets in that data flow, the sending edge device 106 will translate them to ESP ZOOM packets which do not include the destination IP address and may not include the source IP address, instead utilizing those bits for out-of-band data. The receiving edge device 106 can look-up the destination IP address and possibly the source IP address from its list of active data flows based on the SPI value information in the ESP ZOOM packet.

With the source and destination IP addresses obtained from the list of active data flows if necessary, the edge device 106 can re-create the original IP packet. To re-create the original IP packet, the edge device 106 re-creates the original IP header with the information from the ZOOM packet, the source and destination IP addresses from the list of active data flows (if necessary). The edge device 106 also re-creates the ESP header (if it is an ESP packet) and TCP header (if the packet had a TCP PDU) based on the information in the ZOOM header. The edge device 106 also copies the bits after the ZOOM header as the remaining bits of the re-created IP packet. This will translate the ZOOM packet back into the original IP packet at that edge device 106. Once the original IP packet is re-created, the IP packet can be forwarded toward its destination(s) behind the second edge device 106-2 (block 412).

In an example, in addition to re-creating the original IP packet or in addition to determining that the original IP packet does not need to be re-created, the second edge device 106-2 can determine whether to forward the ZOOM packet (or a copy thereof) on to other devices in the broadcast network 110 in accordance with the protocol implemented by the broadcast network 110 (block 412). Since it is desirable for the out-of-band data in the ZOOM packet to be received by all edge devices 106 in the broadcast network 110, and because the broadcast network 110 operates to broadcast packets to all devices therein, the second edge device 106-2 may forward to the ZOOM packet on to other devices in the broadcast network 110 in accordance with the protocol followed by the broadcast network 110 (block 416). If the ZOOM packet is not to be forward to other devices in the broadcast network 110 or used to re-create the original IP packet, the second edge device 106-2 can discard the ZOOM packet once the out-of-band data is obtained therefrom (block 418).

With the plurality of edge devices 106 operating in this way to translate and re-create IP packets sent through the broadcast network 110, out-of-band data can be exchanged among the edge devices 106 with few or no additional bits as compared to forwarding IP packets themselves.

In some examples, a set of out-of-band data can be spread across several different ZOOM packets in order to, for example, communicate networking information that is larger than the amount of space available via the bits in a single ZOOM packet.

In an example, each application on an endpoint device 102 sending information for transport via out-of-band data can specify a consistent header which is sent as part of the out-of-band data along with each chunk of data in a ZOOM packet. This header may also contain a dynamic field that is automatically updated each time the application encodes the information into a packet. The out-of-band data header can include two types of dynamic fields, an incrementing value that increments by 1 each time the data is encoded into a packet, or a count value, that indicates how many data segments were encoded into the packet.

Similar to a consistent header, the application interface at an edge device 106 for communication with an endpoint device 102 can also allow an endpoint device 102 to set a "last header" which is used instead of the consistent header when the ZOOM protocol encodes the final segments of the data into a ZOOM packet. The last header does not include any dynamic fields as it is intended to be used as a signal that the data stream is finished sending.

This interface can also allow an endpoint device 102 to set the segment size of the data. The segment size instructs the edge device 106 how to segment the data for encoding into a ZOOM packet. For example, a ZOOM application can have a 5 bit value to send, and a total of 4 such values, giving 20 bits of data total. The application will set the data size to 20 bits with a data segment size of 5 bits, to make sure that each value is sent in its entirety within a single ZOOM packet. Also in this scenario, a consistent header with a dynamic field that is using the "count" update method would be useful.

Setting a segment size of 0, or greater than or equal to the total data size, means that all of the data must fit in a single ZOOM packet. If the data size is too large to fit in a single packet then the data would never be sent, however this is detected when the application tries to add the data to the ZOOM protocol and an error would be returned from the edge device 106 to the application at the endpoint device 102. It is still possible that the total data size which is within the theoretical maximum size of a ZOOM encoded packet but still never gets sent if all of the actual user traffic over the ZOOM network is less then optimal.

Finally, the interface allows the ZOOM application to specify how many times the data should be sent over the network by setting a repeat count. If the repeat count is set to a negative value, then the data is encoded indefinitely until the application removes the data from the ZOOM protocol.

The edge device 106 sending out-of-band data can keep track of the state of the data and allow ZOOM applications to query the state of the data. The state information includes the count of how many times the data was encoded into a ZOOM packet its entirety, the count of how many more times the data will be encoded, a timestamp of the last time the data was encoded in its entirety and a timestamp of the last time any of the data was encoded into a packet.

In an example, newly added ZOOM data at an edge device 106 takes precedence over any existing data when the edge device 106 decides what data to encode into a ZOOM packet. If the data will not fit within the packet, then the edge device 106 moves through the queue data to find any data that will fit in the current ZOOM packet, moving from the newest to the oldest. Once the ZOOM data is sent in its entirety, it is moved to the back of the list. This means that the ZOOM protocol may be interrupted while sending a large amount of data in order to send newly added data, however the protocol supports this and will resume sending the older data at the point it left off at. This approach also allows the ZOOM protocol to make the most efficient use of the IPv4 traffic by embedding whatever data will fit within the extra space available in the packet.

In an example, ZOOM data to be transported at an edge device 106 from an endpoint device 102 is only removed at the request of the endpoint device 102, even after it has been completely sent with no pending repeats. This way the endpoint device 102 may continue to request the state of the data.

In an example, the edge devices 106 can send out-of-band data through the broadcast network 110 via the ZOOM method discussed above or via a standalone ZOOM packet. A standalone ZOOM packet is a ZOOM packet that is not a translation from an IP packet. That is, it is a ZOOM packet that is created independent of any IP packet. In a standalone ZOOM packet, there is more space for out-of-band data because bits from an IP packet are not included. A standalone ZOOM packet may be used when a high level of network bandwidth is available.

Whether an edge device 106 sends the out-of-band data via translating an IP packet or via a standalone IP packet can be also based on whether sufficient outgoing IP packets are available to translate into ZOOM packets. As used herein an "outgoing IP packet" is a packet received at an edge device 106 from an endpoint device 102 for a destination across the broadcast network 110. For example, if it has been longer than a threshold length of time between outgoing IP packets or sets of packets, then the edge device 106 can generate and send a standalone ZOOM packet to communicate its information. In some examples, the threshold length of time can be measured from a point in time that the edge device 106 is ready to send out-of-band data. For example, the edge devices 106 can be configured to send out-of-band data (e.g., reachability information) periodically to keep the other edge devices 106 up-to-date. If no outgoing IP packets or sets of packets traverse through the edge device 106 within a threshold length of time after the point in time that corresponds to the period of sending out-of-band data, the edge device 106 can create and send a standalone ZOOM packet. Other means of determining when to create and send a standalone ZOOM packet can also be used.

Figure 5A:
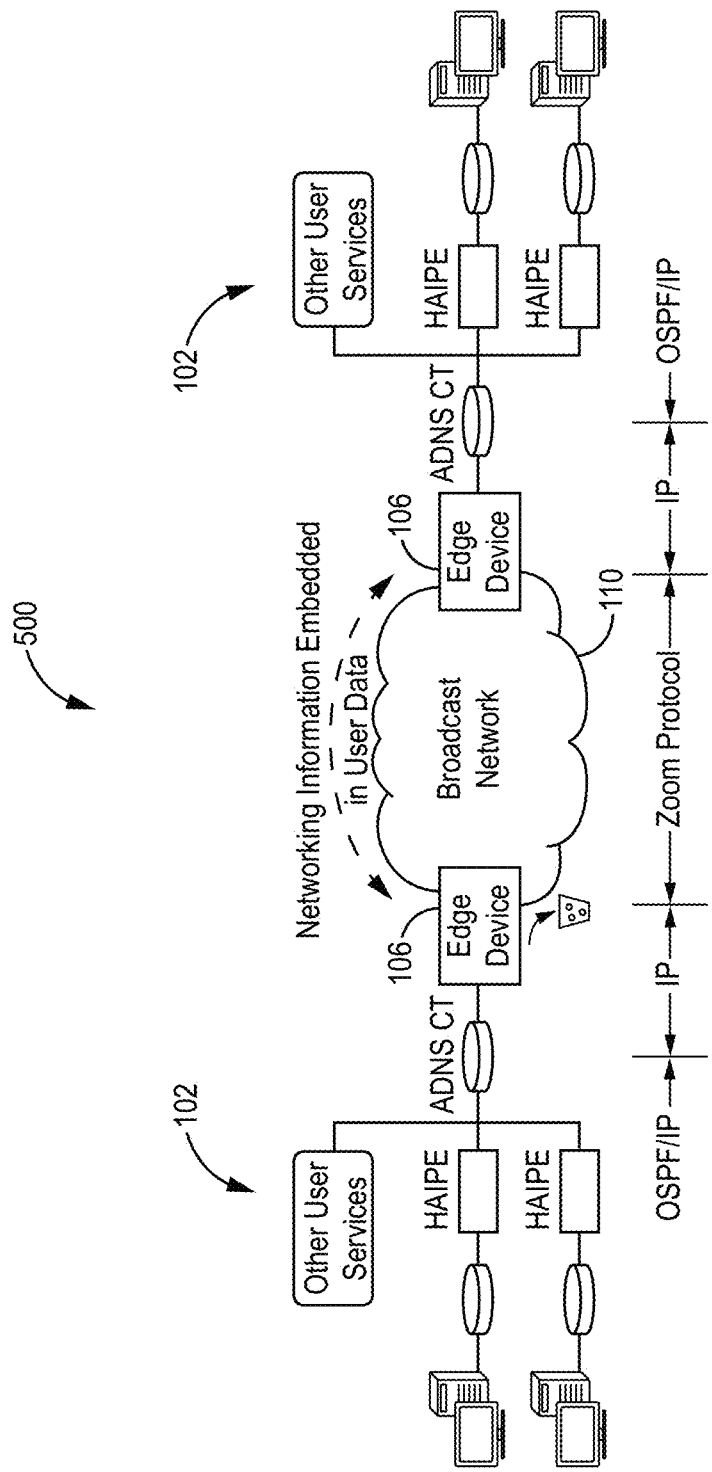
FIG. 5A is a block diagram of an example system including an edge device that controls entry of IP packets by discarding packets.

As mentioned above, based on the reachability information exchanged among the edge devices 106, the edge devices 106 can act to control entry of IP packets into the broadcast network 110. FIG. 5A is a block diagram of an example system 500 in which an edge device 106 can control entry of IP packets by maintaining a respective table of forward destinations and screening IP packets from endpoint devices 102 behind the edge device 106 to determine whether the packets are going to destinations that are reachable via the broadcast network 110. The configuration of edge device 106 described with respect to FIG. 5A is referred to herein as "bridge mode". The edge device 106 can screen a packet from an endpoint device 102 behind the edge device 106 by comparing the destination(s) in the IP header of the packet to the edge device's 106 table of forward destinations. If the IP packet does not have at least one destination on the table of forward destinations, then the edge device 106 discards the packet without translating the packet into a ZOOM packet because that packet's destination(s) are not reachable via the broadcast network 110. If the packet does have at least one destination on the table of forward destinations, the edge device 106 translates the IP packet into a ZOOM packet and sends the ZOOM packet into the broadcast network 110. In an example, routers communicating with the edge device 106 are setup such that their default route is to the edge device 106. Thus, IP packets received by those routers are sent to the edge device 106. In such an example, the edge device 106 discards routing protocol messages (e.g., OSPF) messages from those routers so that those messages are not translated into ZOOM packets and potentially Flood the network with such messages.

Figure 5B:
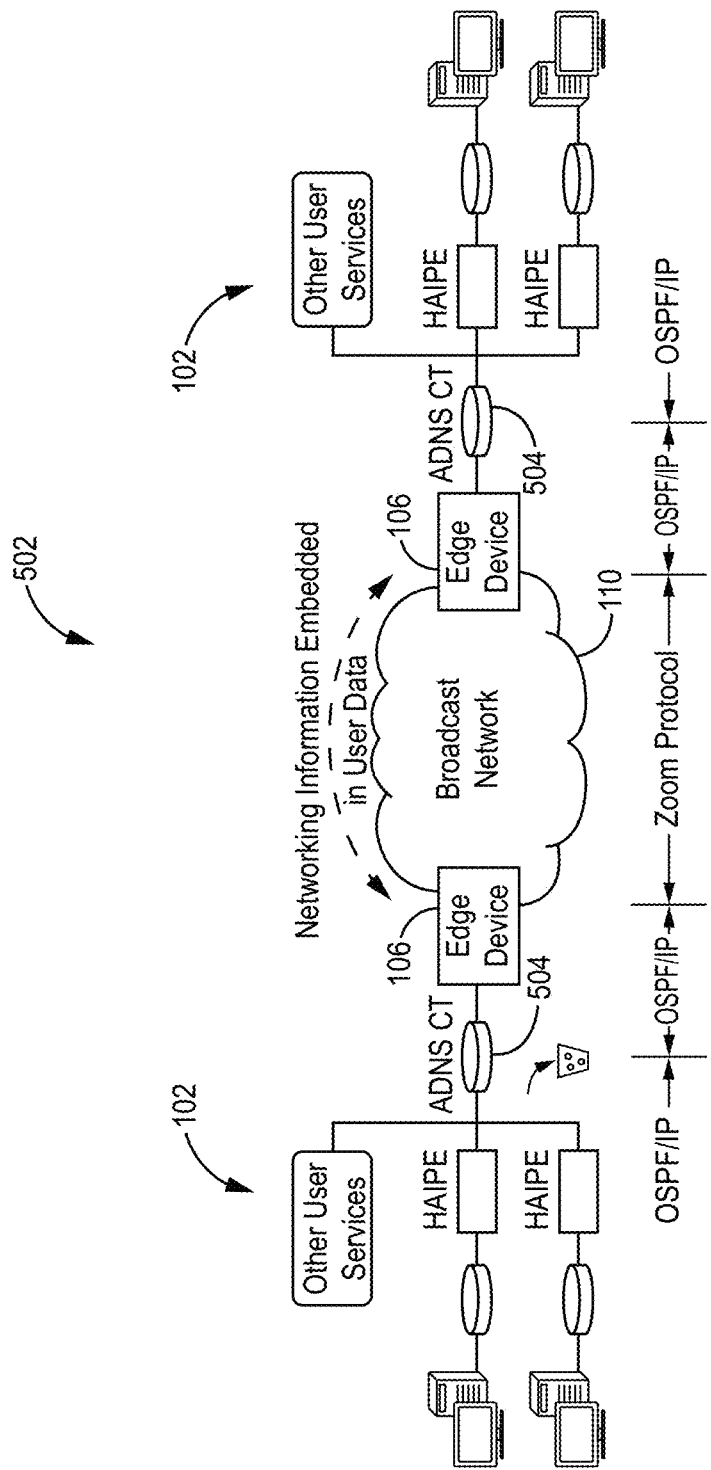
FIG. 5B is a block diagram of an example system including an edge device that controls entry of IP packets by communicating reachability information to a router therebehind.

In another example, an edge device 106 can control packets by sending reachability information to a router therebehind, wherein the router is executing a dynamic routing protocol. FIG. 5B is a block diagram of an example system 502 including such an edge device 106. The configuration of edge device 106 described with respect to FIG. 5B is referred to herein as "router mode". System 500 includes one or more endpoint devices 102 communicatively coupled behind the edge device 106, which is part of a broadcast network 110. System 500 also includes one or more routers 504 communicatively disposed between the endpoint device(s) 102 and the edge device 106. The one or more routers 504 are implementing a dynamic routing scheme to dynamically identify and update routes to destinations. In this example, the edge device 106 also includes some or all of the functionality of a router along with its functionality of an edge device 106 as discussed above. The router functionality is used by the edge device 106 to communicate with the one or more routers 504 using layer 3 messaging in accordance with the dynamic routing protocol used by the router(s) 504. In an example, the edge device 106 communicates with the router(s) 504 such that the edge device 106 appears to the router(s) 504 as another router and peers with that other router(s) 504. For example, if one of the other routers 504 is an Automated Digital Name System (ADNS) router, the edge device 106 can be configured to appear as an autonomous system border router to the ADNS router 504.

One such layer 3 messaging that the edge device 106 communicates is reachability information to the router(s) 504 indicating the destinations that are reachable over the broadcast network 110 via the edge device 106. By communicating the destinations that are reachable to the router(s) 504 disposed behind the edge device 106, those router(s) 504 in the process of performing their normal dynamic routing functions will only forward packets to the edge device 106 if those packets have a destination that is reachable via the edge device 106. Because the edge device 106 is providing to the router(s) 504, the reachability information it receives from other edge devices 106 in the broadcast network 110, the router(s) 504 will naturally filter packets so that packets for destinations that are not reachable via the broadcast network 110 are not sent to the edge device 106. In this way, the reachability information that is shared among the edge devices 106 can also be shared with routers 504 communicatively coupled to the edge devices 106 so that the edge devices 106 and routers 504 can work together to control which packets are sent into the broadcast network 110. Moreover, with the edge devices 106 configured to communicate with the routers 504 according to the dynamic routing protocol in use by the routers 504, the routers 504 will perform their portion of the packet control in the normal course without any special modification. In an example, the router(s) 504 operate using an open shortest path first (OSPF) dynamic routing protocol and the edge devices 106 communicate reachability and other information to the router(s) 504 in accordance with the OSPF protocol, e.g., using metric type 5 link-state advertisements.

In an example, each edge device 106 in the broadcast network 110 of FIG. 1 can be individually set to operate in "bridge mode" to discard packets locally based on its own table of forward destinations as discussed above, or can be set to operate in "router mode" where the edge device 106 sends reachability information to routers communicatively coupled therebehind. In an example, a given edge device 106 can operate in bridge mode for ports that are coupled to an endpoint device 102 without a router implementing a dynamic routing protocol therebetween and can operate in router mode for ports that are coupled to a router implementing a dynamic routing protocol. Thus, the edge device 106 can operate differently for different ports thereof. In an implementation of such an example, the edge device 106 can automatically discover routers and determine whether those routers are implementing a dynamic routing protocol and automatically set a given port to router mode if that port is communicatively coupled to a router implementing a dynamic routing protocol.

With all the edge devices 106 sharing reachability information and screening IP packets in this way, both the superfluous user data as well as the bandwidth for networking information in the broadcast network 110 are reduced or eliminated. Reduction of either of these results in more bandwidth in the broadcast network 110 for legitimate user data, which can be especially valuable in a low-bit rate network.

In an example, the edge devices 106 each have a respective list of backward destinations, which is a list of the destinations that are reachable behind that edge device 106. For example, edge device 106-1 can have a list of backward destinations that indicates endpoint device 102-1 as a backward destination thereof. Edge device 106-2 can have a list of backward destinations that indicate endpoint device 102-2 as a backward destination thereof. In an example, the list of backward destinations can include both single hop and multi-hop destinations reachable behind that edge device 106. The edge devices 106 use their list of backward destinations for the reachability information they send to other edge device 106. For example, edge device 106-1 sends reachability information indicating that each destination in the list of backward destinations is reachable therefrom. The destination(s) in the list of backward destinations for an edge device 106 can be indicated in one IP packet with reachability information or can be spread across multiple IP packets.

In an example, the list of backward destinations for an edge device 106 is manually set by a network administrator.

That is, the destinations that the edge device 106 advertises in its reachability information are manually set by a network administrator. Manually setting these destinations can simplify the operation of the edge device 106 and may be suitable for situations in which the destinations or subnets behind an edge device 106 are generally static. Even in such situations where the list of backward destinations behind an edge device 106 is manually set, that edge device 106 will still dynamically update its table of forward destinations. Thus, although the destinations behind the edge device 106 are statically (manually) set, the destinations in front of the edge device 106 (i.e., destinations reachable via the broadcast network 110) are dynamically updated. In other examples, the list of backward destinations that are reachable behind the edge device 106 can also be dynamically updated. In such an example, changes to the list can be identified by the edge device 106 through messaging (e.g., layer 3) with networking devices (e.g., routers) behind that edge device 106, through tracking source addresses of packets, through a discovery mechanism, or via other means. In an example, the list of backward destinations is manually set when the edge device 106 is in "bridge mode" and is dynamically identified and updated when the edge device 106 is in "router mode". In an example, the list of backward destinations can be dynamically identified and updated by processing link-state advertisements (LSAs) from ADNS routers communicatively coupled behind the edge device 106. The destinations in the list of backward destinations are communicated via the reachability information over the broadcast network 110 to the other edge devices 106 as discussed above.

In an example, the edge devices 106 continually (e.g., periodically) re-communicate reachability information indicating the reachability of their backward destinations. For an edge device 106 with a manually set list of backward destinations, the list of backward destinations is not dynamically updated by the edge device 106. Nevertheless, there is still value in continually re-communicating reachability information to the other edge devices 106. For example, the re-communicated reachability information can be used by new edge devices 106 that join the broadcast network 110 after the previous reachability information was communicated. Also, the re-communicated reachability information can be used by other edge devices 106 to verify that a destination in its table of forward destinations is still reachable. For example, each edge device 106 can be configured to update their table of forward destinations to reflect previously reachable forward destinations that are no longer reachable. A previously reachable destination may no longer be reachable, for example, if the edge device 106 in front of that destination loses communication with the broadcast network 110. The edge devices 106 can be configured to identify such no longer reachable destinations and remove those destinations from their table of forward destinations or otherwise indicate in their table that the destination is not reachable.

In an example, the edge devices 106 can identify destinations in their tables that are no longer reachable based on a lack of continually receiving reachability information indicating that the destination is reachable. In an implementation of such an example, each edge device 106 can be configured to periodically send reachability information indicating the reachability of all destinations therebehind. In such an implementation, an edge device 106 can be configured to remove a destination from its table of destinations if no information for that destination is received within a threshold period of time (e.g., three reporting periods). Thus, when an edge device 106 leaves the broadcast network 110 its reachability information will no longer be received by the other edge devices 106. If the destination(s) in its reachability information are not reachable via another edge device 106, then upon not receiving reachability information indicating the reachability of the destinations of that edge device within a threshold period of time, the other edge devices 106 will remove those destination(s) from their tables of reachable destinations. In other implementations, the edge devices 106 can track which edge device 106 corresponds to each destination in their table of forward destinations and the edge devices 106 can, instead of sending all their reachability information through the broadcast network 110, periodically send a hello message indicating that they are still present. In response to receiving the information that that edge device 106 is still present, the other edge devices 106 can keep the destinations corresponding to that edge device 106 indicated as being reachable in their tables. Conversely, if a hello message from an edge device 106 is not received for a threshold length of time, the other edge devices 106 can remove the corresponding destinations or otherwise indicate them as not reachable in their tables.

In an example and as discussed above, some or all of the possible subnets that may be a destination in the system 100 are known a priori and the edge devices 106 are pre-configured with a set of index numbers, each of which are assigned to a respective subnet in the system 100. For example, a first subnet can be assigned the index number '0001', a second subnet can be assigned the index number '0002', etc. With the edge devices 106 pre-configured with the correspondence between index numbers and subnets, the edge devices 106 can send the corresponding index numbers in their networking information (e.g., reachability information) to indicate a given subnet in system 100. Sending index numbers instead of the subnet address can reduce the number of bits needed to communicate the information.

Figure 6:
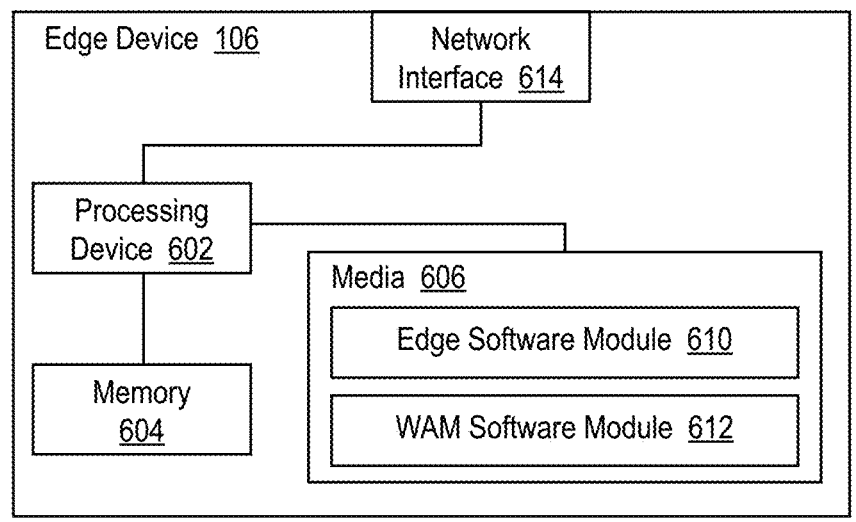
FIG. 6 is a block diagram of an example edge device.

FIG. 6 is a block diagram of an example edge device 106. Each edge device 106 can include an edge software module 610 which is software including instructions to implement the functionality of an edge device 106 or a portion of the functionality of an edge device 106 described herein. The edge software module 610 can include instructions which, when executed by one or more processing devices 602 of the edge device 106, perform functionality of an edge device 106 described herein. The edge device 106 can also include other software modules to implement other functionality such as a WAM module 612 to implement the functionality of a WAM. In an example, the edge module 610 can interact with one or more application programming interfaces (APIs) of the WAM module 612 to obtain information and control aspects of the WAM module 612, such as information/control relating to the link state information or control channel of the WAM. The edge module 610 can be a software module that is loaded onto a hardware device at the factory during manufacture or can be an add-on software module that is loaded onto a commercial off-the-shelf (COTS) device (e.g., WAM) in the field.

The one or more processing devices 602 can execute the instructions of the edge software module 610 and the WAM module 612. The one or more processing devices 602 can include a general-purpose processor or a special purpose processor. The instructions of the edge module 610 are stored (or otherwise embodied) on or in an appropriate storage medium or media 606 (such as a flash or other non-volatile memory) from which the instructions are readable by the processing device(s) 602 for execution thereby. The edge device 106 also includes memory 604 that is coupled to the processing device(s) 602 for storing instructions and related data) during execution by the processing device(s) 602. Memory 604 comprises, in one implementation, any suitable form or random-access memory (RAM) now known or later developed, such as dynamic random-access memory (DRAM). In other implementations, other types of memory are used. The instructions of the edge module 610, when executed by the one or more processing devices 602, cause the one or more processing devices 602 to perform the actions (or a portion thereof) of an edge device 106 described herein.

The edge device 106 also includes one or more network interfaces 614 for communicating with devices behind and/or in front of the edge device 106. The one or more network interfaces 614 can be coupled to the one or more processing devices 602. The one or more network interfaces can include wired and/or wireless interfaces such as an Ethernet interface, a satellite transceiver, an IEEE 802.11 transceiver, a cellular transceiver, or other interface.

Figure 7:
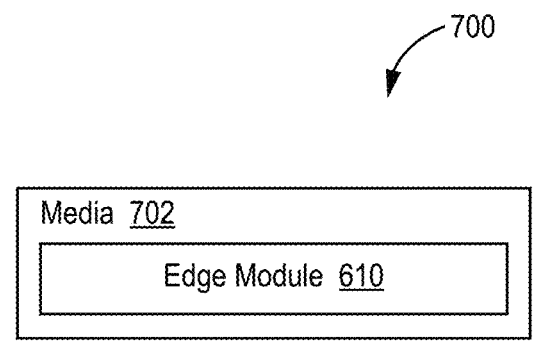
FIG. 7 is a block diagram of an example program product including an edge software module for an edge device.

FIG. 7 is a block diagram of an example software product edge module 700. The software product 700 includes a computer readable medium 702 including an edge software module 610 that can be loaded onto an appropriate hardware device. The edge module 610 includes instructions that are stored or other embodied on the computer readable medium 702 that is distinct from any processing device(s), memory, or other associated hardware for executing those instructions. The edge module 610 instructions can be loaded onto an appropriate hardware device, such as the edge device 106 shown in FIG. 6, for the hardware device to execute the instructions and perform the functionality (or a portion thereof) of an edge device 106 described herein. The computer readable medium 702 on which the edge module 610 is stored can be any suitable computer readable media, such as a magnetic media such as a hard disk drive (HDD), optical media such as a CD, DVD, Blu-Ray disk, or a non-volatile electric media such as a solid-state drive (SDD), flash media, or EEPROM. Such computer readable media can be stand-alone media (e.g., a USB stick or CD) or can be computer readable media within a computing device (e.g., a server or network accessible storage).

Figure 8:
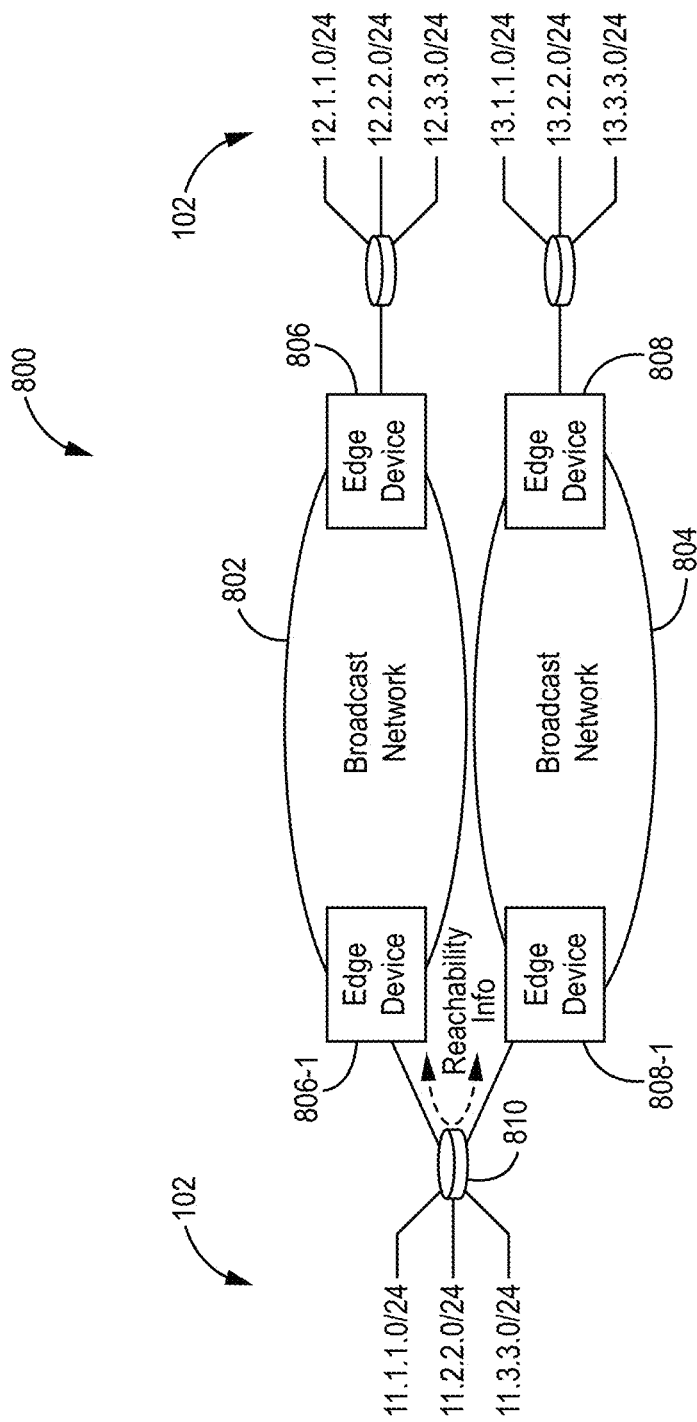
FIG. 8 is a block diagram of an example system including two edge devices communicatively coupling different broadcast networks together.

FIG. 8 is a block diagram of another example system 800 in which a plurality of edge devices 106 can be used. System 800 includes a first broadcast network 802 and a second broadcast network 804. The first broadcast network 802 includes a first plurality of edge devices 806. The second broadcast network 804 includes a second plurality of edge devices 808. In this example, the first broadcast network 802 is communicatively coupled to the second broadcast network 804 via respective edge devices 806-1, 808-1 and another networking device 810. The first edge device 806-1 is part of the first broadcast network 802 and the second edge device 808-1 is part of the second broadcast network 804. The first edge device 806-1 is communicatively coupled to the second edge device 808-1 via a networking device (e.g., router) 810. In other examples, the first edge device 806-1 can be directly coupled to the second edge device 808-1 or there can be more than one networking device communicatively coupled between the first edge device 806-1 and the second edge device 808-1.

The first plurality of edge devices 806 can exchange networking information as discussed above to maintain respective tables of forward destinations for the first broadcast network 802. The second plurality of edge devices 808 can also exchange networking information to maintain respective tables of forward destinations for the second broadcast network 804. Additionally, the first and second edge devices 806-1, 808-1 can exchange networking information, including reachability information, to learn of the destinations reachable via the other broadcast network 802, 804.

The first edge device 806-1 can communicate reachability information to the second edge device 808-1, the reachability information indicating which forward destinations are reachable from the first edge device 806-1. The forward destinations communicated can be the forward destinations indicated as reachable in the table of forward destinations maintained by the first edge device 806-1. If the first edge device 806-1 continually (e.g., periodically) communicates its forward reachable destinations from its up-to-date table of forward destinations, the second edge device 808-1 can stay up-to-date on which destinations are reachable via the first edge device 806-1.

The second edge device 808-1 can likewise communicate reachability information to the first edge device 806-1, the reachability information indicating which forward destinations are reachable from the second edge device 808-1. The forward destinations communicated can be the forward destinations indicated as reachable in the table of forward destinations maintained by the second edge device 808-1. If the second edge device 808-1 continually (e.g., periodically) communicates its forward reachable destinations from its up-to-date table of forward destinations, the first edge device 806-1 can stay up-to-date on which destinations are reachable via the second edge device 808-1.

In response to receiving reachability information from the first edge device 806-1, the second edge device 808-1 can add the destinations indicated as reachable from the first edge device 806-1 to its list of backward destinations. The first edge device 806-1 can likewise add the destinations indicated as reachable from the second edge device 808-1 to its list of backward destinations. Based on continual reception of this reachability information, the first and second edge devices 806-1, 808-1 can maintain their lists of backward destinations to reflect the up-to-date reachability of the destinations in the other broadcast network 802, 804.

With the list of backward destinations in the first and second edge devices 806-1, 808-1 including not only the endpoint devices 102 and/or subnets communicatively coupled behind those devices 806-1, 808-1, but also including the destinations reachable via the other broadcast network 802, 804, the first and second edge devices 806-1, 808-1 will include the destinations reachable via the other broadcast network 802, 804 in their reachability information sent in their own broadcast network 802, 804. That is, the first edge device 806-1 will advertise reachability of destinations in the second broadcast network 804 to other edge devices 806 in the first broadcast network 802. Likewise, the second edge device 808-1 will advertise reachability of destinations in the first broadcast network 802 to other edge devices 808 in the second broadcast network 804. In this way, the first and second plurality of edge devices 806, 808 can all learn of the reachability of all destinations via both the first broadcast network 802 and the second broadcast network 804. Accordingly, the communicative coupling and networking information exchanged between the first and second edge devices 806-1, 808-1 forms one mutable network out of the two broadcast networks 802, 804.

Additionally, via the reachability information exchanged between the first and second edge devices 806-1, 808-1 and the reachability information exchanged amongst the first plurality of edge devices 806 and second plurality of edge devices 808, the first and second plurality of edge devices 806, 808 can all stay up-to-date on new destinations that are reachable and previously reachable destinations that are no longer reachable in both broadcast networks 802, 804.

In an example, the first and second edge devices 806-1, 808-1 are manually configured to send the reachability information (and other networking information) therebetween. That is, a network operator manually sets the first edge device 806-1 to communicate with the second edge device 808-1 and vice versa. In other examples, the first and second edge devices 806-1, 808-1 can automatically discover each other (when they are in router mode for example) using layer 3 messages.

The networking information sent between the first and second edge devices 806-1, 808-1 can be in standalone ZOOM packets and can have any suitable format including a format complying to a dynamic routing protocol, such as OSPF. In an example, the reachability information and other networking information exchanged between first and second edge devices 806-1, 808-1 is exchanged via the intermediary networking device (e.g., router) 810. The first and second edge devices 806-1, 808-1 can send the reachability information to the intermediary networking device 810 in accordance with a dynamic routing protocol (e.g., OSPF) in which the intermediary networking device 810 operates. Further in accordance with the dynamic routing protocol, the intermediary networking device 810 can sends its own reachability information which includes the reachability of destinations it received from the first and second edge devices 806-1, 808-1. The first and second edge devices 806-1, 808-1 will then receive this reachability information from the intermediary networking device 810 and learn of the reachability of the destinations in the other broadcast network 802, 804.

Although two broadcast networks 802, 804 and two corresponding edge devices 806-1, 808-1 are shown in the example of FIG. 8, more than two broadcast networks 802, 804 can be communicatively coupled together in this way via networking information exchange between corresponding edge devices.

Figure 9A:
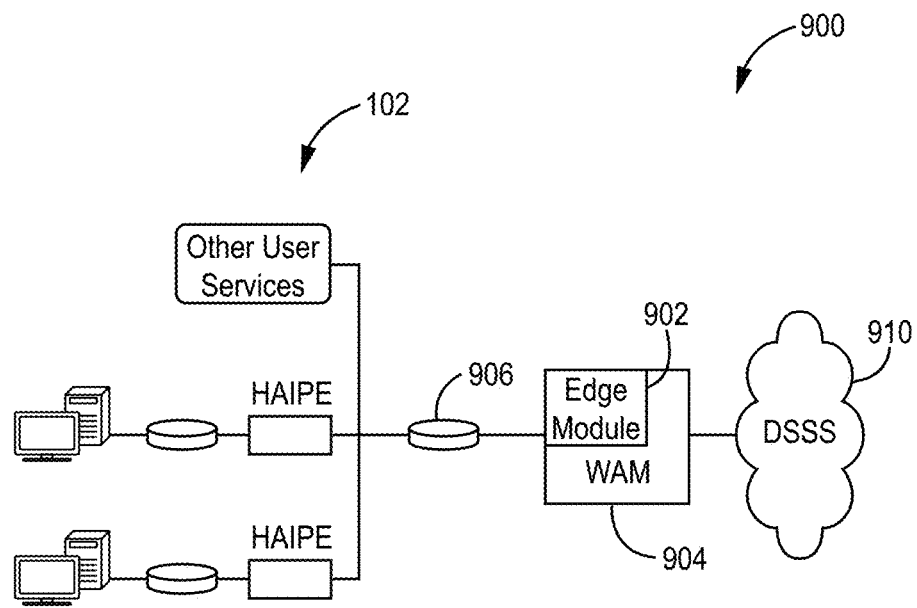
FIG. 9A is a block diagram of an example system in which an edge device is a commercial off-the-shelf (COTS) device having an edge software module loaded thereon.

FIG. 9A is a block diagram of an example system 900 including an edge device in which an edge software module 902 is embedded into a commercial off-the-shelf (COTS) device, causing the COTS device to perform the functionality of an edge device 106 described herein. In this example, the COTS device is a wideband anti-jam modem (WAM) 904 which is configured to perform the functions of an edge device 106 along with the functions of the WAM. In this example the broadcast network 110 is a satellite communications network 910 and the WAM operates in accordance with a WAM direct sequence spread spectrum (DSSS) mode specification (e.g., version 0.8 or version 2.0) promulgated by the United States Navy. The WAM 904 has the edge software module 902 loaded thereon which, when executed by processing device(s) of the WAM 904, causes the WAM 904 to perform the functions of an edge device 106 described herein. The WAM 904 can also perform the regular functions of a WAM, which includes communicating in accordance with the DSSS specification of the broadcast network 910. The system 900 can also include a router (e.g., ADNS router) 906 and a plurality of endpoint devices 102 communicatively disposed behind the WAM 904.

Figure 9B:
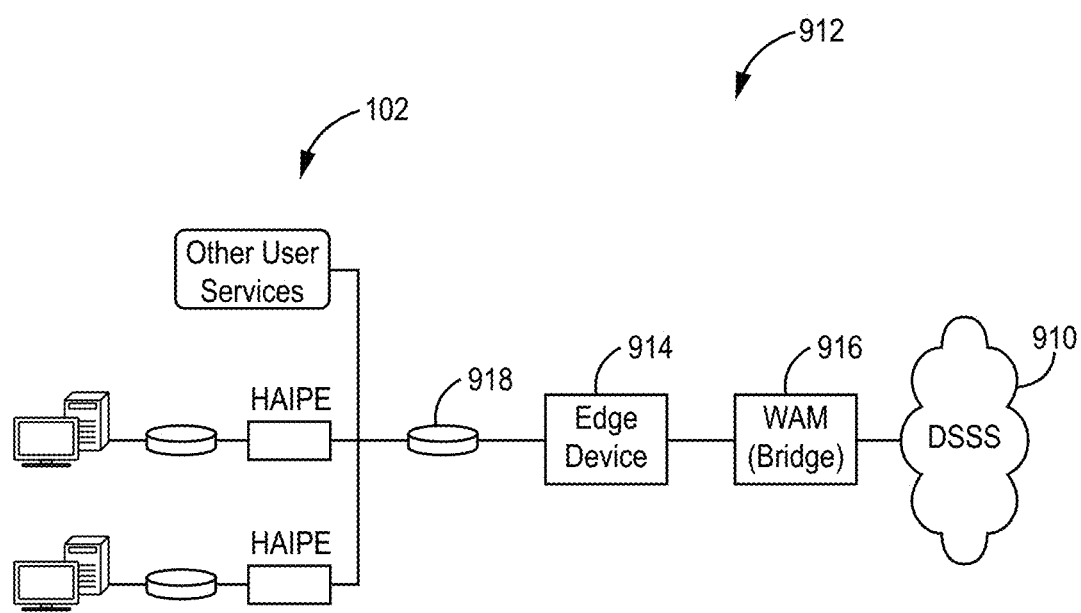
FIG. 9B is a block diagram of an example system in which an edge device is a stand-alone hardware appliance.

FIG. 9B is a block diagram of an example system 912 including an edge device that is a stand-alone hardware appliance 914. The stand-alone hardware appliance 914 can include an edge software module causing the stand-alone appliance 914 to perform the functions of an edge device 106 described herein. The system 912 can also include a WAM 916 disposed in front of the stand-alone appliance 914 for sending and receiving signals in a DSSS broadcast network 910. The hardware appliance 914 can include a network interface (e.g., Ethernet interface) to send and receive packets with the WAM 916. The hardware appliance 514 can also include one or more other network interfaces (e.g., Ethernet and/or Wi-Fi interfaces) for sending and receiving packets with endpoint devices 102 and/or subnet(s) behind the appliance 914. The system 912 can also include a router (e.g., ADNS router) 918 and a plurality of endpoint devices 102 communicatively disposed behind the stand-alone appliance 914.

What is claimed is:

1. A method of embedding information in a packet with low overhead, the method comprising:
   receiving, at a first networking device over a network link, an original internet protocol (IP) packet having an IP header and an IP data field, wherein the IP data field includes a transport layer protocol data unit (PDU) including a transport layer header and a transport layer data field;
   translating, at the first networking device, the original IP packet into an intermediary packet, the intermediary packet having a non-IP header and a data field, wherein translating includes:
      copying at least the transport layer data field into the data field of the intermediary packet;
      compressing the IP header; and
      embedding out-of-band data into the non-IP header of the intermediary packet;
   sending the intermediary packet to a second networking device;
   receiving the intermediary packet at the second networking device;
   translating, at the second networking device, the intermediary packet into a re-created IP packet, wherein translating includes:
      extracting the out-of-band data from the non-IP header of the intermediary packet;
      copying at least the transport layer data field from the data field of the intermediary packet into an IP data field of the re-created IP packet; and
      creating an IP header for the re-created IP packet to correspond to the IP header of the original IP packet; and
   sending, over a network link from the second networking device, the re-created IP packet toward a destination of the original IP packet.

2. The method of claim 1, wherein the out-of-band data includes control plane networking information for a network protocol implemented by the first networking device and the second networking device.

3. The method of claim 2, wherein the control plane networking information includes one or more of reachability information, network link monitoring information, or network link management information.

4. The method of claim 1, wherein the out-of-band data includes information received at the first networking device over a network link, the information received via payload of a second packet which is different than the original IP packet.

5. The method of claim 4, comprising:
   sending, over a network link from the second networking device, the extracted out-of-band data via a packet different than the re-created IP packet.

6. The method of claim 4, wherein a first device is a source of the original IP packet and a second device is a source of the second packet.

7. A method of embedding information in one or more IP packets being sent across a non-IP network, the method comprising:
   providing a plurality of networking devices
   receiving a plurality of original IP packets at a first networking device over one or more network links;
   determining, at the first networking device, whether each of the plurality of original IP packets is compatible for embedding of out-of-band data, wherein determining is based on characteristics of an IP header of the IP packet;
   for each of the plurality of original IP packets that is not compatible:
      sending the original IP packet to one or more other networking devices; and
      forwarding, from the one or more other networking devices, the original IP packets toward a destination IP address thereof;
   for one or more of the plurality of original IP packets that are compatible:
      translating, at the first networking device, the original IP packet into an intermediary packet, the intermediary packet having a non-IP header and a data field, wherein translating includes copying at least the transport layer data field into the data field of the intermediary packet, compressing the IP header, and embedding out-of-band data into the non-IP header of the intermediary packet; and
      sending the intermediary packet to a second networking device
   receiving the intermediary packet at the second networking device;
   translating, at the second networking device, the intermediary packet into a re-created IP packet, wherein translating includes extracting the out-of-band data from the non-IP header of the intermediary packet, copying at least the transport layer data field from the data field of the intermediary packet into an IP data field of the re-created IP packet, creating an IP header for the re-created IP packet to correspond to the IP header of the original IP packet; and
   sending, over a network link from the second networking device, the re-created IP packet toward a destination of the original IP packet.

8. The method of claim 7, wherein the characteristics of an original IP packet on which determining whether the original IP packet is compatible include whether the IP packets has options data, wherein if the original IP packets does have options data the original IP packet is not compatible and if an original IP packet does not have options data, the original IP packet is compatible.

9. The method of claim 7, wherein compressing the IP header includes:
   copying a value in a differentiated services code point (DSCP) field of the IP header into the non-IP header;
   copying a value in an explicit congestion notification (ECN) field of the IP header into the non-IP header;
   copying at least the 11 least-significant bits of a value in a total length field of the IP header into the non-IP header,
   representing, in the non-IP header, with fewer bits than used in the IP header, one or more of the following fields of the IP header: a version field, an internet header length field, an identification field, a reserved flag field, a don't fragment field, a more fragment field, a fragment offset field, a time-to-live field, a protocol field, a source IP address field, and a destination IP address field.

10. The method of claim 7, wherein compressing the IP header includes:
   representing, in the non-IP header, with fewer bits than used in the IP header, one or both of a value in a security parameters index (SPI) field and a value in a sequence number field of an encapsulating security payload (ESP) extension header of the IP header.

11. The method of claim 7, wherein compressing the IP header includes:
   representing, in the non-IP header, with fewer bits than used in the IP header, one or more of a value in a security parameters index (SPI) field, a value in a sequence number field, a value in a next header field, and a value in a payload length field of an authentication header (AH) extension header of the IP header.

12. The method of claim 7, wherein translating the original IP packet includes:
   representing, in the non-IP header, a transmission control protocol (TCP) header of the original IP packet with fewer bits than used in the TCP header of the original IP packet.

13. The method of claim 7, wherein the out-of-band data includes control plane networking information for a network protocol implemented by the first networking device and the second networking device.

14. The method of claim 13, wherein the control plane networking information includes one or more of reachability information, network link monitoring information, or network link management information.

15. The method of claim 7, wherein the out-of-band data includes information received at the first networking device over a network link, the information received via payload of a second packet which is different than the original IP packet.

16. The method of claim 7, wherein the plurality of original IP packets have a plurality of sources and wherein respective portions of out-of-band data from the second packet are embedded into respective packets translated from original IP packets having different sources of the plurality of sources.

17. A program product comprising:
   a non-transitory processor readable medium having software stored thereon, the software, when executed by one or more processing devices of a first networking device, configured to:
      receive, at the first networking device over a network link, an original internet protocol (IP) packet having an IP header and an IP data field, wherein the IP data field includes a transport layer protocol data unit (PDU) including a transport layer header and a transport layer data field;
      translate, at the first networking device, the original IP packet into an intermediary packet, the intermediary packet having a non-IP header and a data field, wherein translating includes copying at least the transport layer data field into the data field of the intermediary packet, compressing the IP header, and embedding out-of-band data into the non-IP header of the intermediary packet;
      send the intermediary packet to a second networking device;
      receive the intermediary packet at the second networking device;

translate, at the second networking device, the intermediary packet into a re-created IP packet, wherein translating includes extracting the out-of-band data from the non-IP header of the intermediary packet, copying at least the transport layer data field from the data field of the intermediary packet into an IP data field of the re-created IP packet, creating an IP header for the re-created IP packet to correspond to the IP header of the original IP packet; and send, over a network link from the second networking device, the re-created IP packet toward a destination of the original IP packet.

18. The program product of claim 17, wherein the control plane networking information includes one or more of reachability information, network link monitoring information, or network link management information.

19. The program product of claim 18, wherein the control plane networking information includes one or more of reachability information, network link monitoring information, or network link management information.

20. The program product of claim 17, wherein the out-of-band data includes information received at the first networking device over a network link, the information received via payload of a second packet which is different than the original IP packet.

\* \* \* \* \*